(12) United States Patent
Kroeger et al.

(10) Patent No.: US 9,634,704 B2
(45) Date of Patent: Apr. 25, 2017

(54) FM ANALOG DEMODULATOR COMPATIBLE WITH IBOC SIGNALS

(71) Applicant: iBiquity Digital Corporation, Columbia, MD (US)

(72) Inventors: Brian W. Kroeger, Sykesville, MD (US); Paul J. Peyla, Elkridge, MD (US)

(73) Assignee: iBiquity Digital Corporation, Columbia, MD (US)

( * ) Notice: Subject to any disclaimer, the term of this patent is extended or adjusted under 35 U.S.C. 154(b) by 0 days.

(21) Appl. No.: 14/920,720

(22) Filed: Oct. 22, 2015

(65) Prior Publication Data

US 2016/0043760 A1 Feb. 11, 2016

Related U.S. Application Data

(62) Division of application No. 13/189,659, filed on Jul. 25, 2011, now Pat. No. 9,184,961.

(51) Int. Cl.
| | |
|---|---|
| *H04B 17/00* | (2015.01) |
| *H04B 1/12* | (2006.01) |
| *H04L 27/156* | (2006.01) |
| *H04B 1/10* | (2006.01) |
| *H04L 27/14* | (2006.01) |

(52) U.S. Cl.
CPC .......... *H04B 1/123* (2013.01); *H04B 1/1036* (2013.01); *H04L 27/14* (2013.01); *H04L 27/156* (2013.01); *H04B 2001/1045* (2013.01)

(58) Field of Classification Search
CPC ......... G06F 11/27; H04B 17/00; H04B 17/17; H04B 17/19; H04B 5/0062
USPC ............................................ 455/67.11, 67.14
See application file for complete search history.

(56) References Cited

U.S. PATENT DOCUMENTS

| | | |
|---|---|---|
| 4,005,399 A | 1/1977 | Pazemenas |
| 4,332,978 A | 6/1982 | Streeter |
| 4,349,696 A | 9/1982 | Akitake et al. |
| 4,817,151 A | 3/1989 | Bod et al. |
| 5,440,586 A | 8/1995 | Den Braber |
| 6,031,418 A | 2/2000 | Fowler |
| 6,714,651 B2 | 3/2004 | Yamamoto |
| 7,221,917 B2 | 5/2007 | Kroeger |
| 7,406,302 B1 | 7/2008 | Lou |
| 7,474,707 B2 | 1/2009 | Kroeger |
| 7,546,088 B2 | 6/2009 | Kroeger et al. |
| 7,933,368 B2 | 4/2011 | Peyla et al. |
| 7,944,998 B2 | 5/2011 | Shridhar et al. |
| 7,953,183 B2 | 5/2011 | Shridhar et al. |

(Continued)

OTHER PUBLICATIONS

U.S. Appl. No. 13/165,325, filed Jun. 21, 2011, Kroeger et al.
National Radio Systems Committee, "NRSC-5-B In-band/on-channel Digital Radio Broadcasting Standard", Apr. 2008.

*Primary Examiner* — Xin Jia
(74) *Attorney, Agent, or Firm* — Michael D. Lazzara, Esq.; Pietragallo Gordon Alfano Bosick & Raspanti, LLP

(57) ABSTRACT

A method includes: receiving an FM radio signal including an analog-modulated portion; digitally sampling an analog-modulated portion of the radio signal to produce a plurality of samples; using a ratio between an average magnitude and an RMS magnitude of a block of the samples to compute a signal quality metric; detecting sum and difference components of the baseband multiplex signal content; using the baseband content to produce an output signal; and blending the output signal from stereo to monaural as the signal quality metric falls below a threshold value.

12 Claims, 17 Drawing Sheets

(56) References Cited

U.S. PATENT DOCUMENTS

| | | |
|---|---|---|
| 2004/0165680 A1 | 8/2004 | Kroeger |
| 2006/0083384 A1 | 4/2006 | Zoso et al. |
| 2006/0135098 A1 | 6/2006 | Yarosz et al. |
| 2010/0284550 A1 | 11/2010 | Oh et al. |
| 2011/0229127 A1 | 9/2011 | Sakamoto et al. |
| 2012/0140806 A1 | 6/2012 | Turner et al. |
| 2012/0237040 A1 | 9/2012 | Holland et al. |

CONVENTIONAL FM RECEIVER WITH STEREO DECODER

FM ANALOG DEMODULATOR

FM ANALOG DEMODULATOR COMPATIBLE WITH IBOC SIGNALS

CROSS-REFERENCE TO RELATED APPLICATION

This application is a divisional application of U.S. patent application Ser. No. 13/189,659, filed Jul. 25, 2011, and titled "FM Analog Demodulator Compatible with IBOC Signals", which is hereby incorporated by reference.

FIELD OF THE INVENTION

This invention relates to radio broadcasting receivers, and more particularly to methods and apparatus for FM analog demodulation that is compatible with in-band on-channel broadcasting signals.

BACKGROUND OF THE INVENTION

Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands. HD Radio™ Technology, developed by iBiquity Digital Corporation, is one example of an IBOC implementation for digital radio broadcasting and reception.

IBOC DAB signals can be transmitted in a hybrid format including an analog modulated carrier in combination with a plurality of digitally modulated carriers, or in an all-digital format wherein the analog modulated carrier is not used. Using the hybrid mode, broadcasters may continue to transmit analog AM and FM simultaneously with higher-quality and more robust digital signals, allowing themselves and their listeners to convert from analog to digital radio while maintaining their current frequency allocations. IBOC DAB hybrid and all-digital waveforms are described in U.S. Pat. No. 7,933,368, which is hereby incorporated by reference.

IBOC DAB technology can provide digital quality audio, superior to existing analog broadcasting formats. Because each IBOC DAB signal is transmitted within the spectral mask of an existing AM or FM channel allocation, it requires no new spectral allocations. IBOC DAB promotes economy of spectrum while enabling broadcasters to supply digital quality audio to the present base of listeners.

The National Radio Systems Committee, a standard-setting organization sponsored by the National Association of Broadcasters and the Consumer Electronics Association, adopted an IBOC standard, designated NRSC-5, in September 2005. NRSC-5, the disclosure of which is incorporated herein by reference, sets forth the requirements for broadcasting digital audio and ancillary data over AM and FM broadcast channels. The standard and its reference documents contain detailed explanations of the RF/transmission subsystem and the transport and service multiplex subsystems. iBiquity's HD Radio Technology is an implementation of the NRSC-5 IBOC standard.

FM analog receivers implemented with digital signal processor (DSP) algorithms offer high performance, and are common for car radio receivers. They generally offer low distortion, good stereo separation, and often high sensitivity and selectivity. However, IBOC signals may create some new digital interference conditions that were not anticipated by the designers of the FM analog demodulators. Although this digital interference is generally limited to localized reception areas, or occurs infrequently under special signal conditions, there may still be concern about the impact on analog service. Furthermore, the FCC has authorized an increase in digital signal injection power from presently 20 dB below the analog FM host, to 10 dB, potentially increasing the interference.

It would be desirable to have an FM demodulator that is effective in eliminating the effects of interference from IBOC signals.

SUMMARY

In one embodiment, a method includes: receiving an FM radio signal including an analog-modulated portion; digitally sampling an analog-modulated portion of the radio signal to produce a plurality of samples; using a ratio between an average magnitude and an RMS magnitude of a block of the samples to compute a signal quality metric; detecting sum and difference components of the baseband multiplex signal content; using the baseband content to produce an output signal; and blending the output signal from stereo to monaural as the signal quality metric falls below a threshold value.

In another embodiment, an apparatus includes an input for receiving an FM radio signal including an analog-modulated portion; and processing circuitry for digitally sampling an analog-modulated portion of the radio signal to produce a plurality of samples, using a ratio between an average magnitude and an RMS magnitude of a block of the samples to compute a signal quality metric, detecting sum and difference components of the baseband content, using the baseband content to produce an output signal, and blending the output signal from stereo to monaural as the signal quality metric falls below a threshold value.

In another embodiment, a method includes: receiving a radio signal; sampling and filtering the radio signal to isolate the FM portion; demodulating the FM portion of the received signal; applying a sliding window to the first, second, and third samples; and adjusting the value of the second sample if the product of the second sample times the sum of the first and third samples is less than a threshold value.

In another embodiment, an apparatus includes: an input for receiving a radio signal; and processing circuitry for sampling and filtering the radio signal to isolate the FM portion, demodulating the FM portion of the received signal, applying a sliding window to the first, second, and third samples, and adjusting the value of the second sample if the product of the second sample times the sum of the first and third samples is less than a threshold value.

DETAILED DESCRIPTION

In various aspects, the following description describes an FM demodulator including a low sample rate, predetection filtering to accommodate extended IBOC subcarriers, click and modulus overflow mitigation, blend-to-analog as a function of predetection signal quality (e.g., first-adjacent digital interference), and stereo-subcarrier nonlinearity correction.

Figure 1:
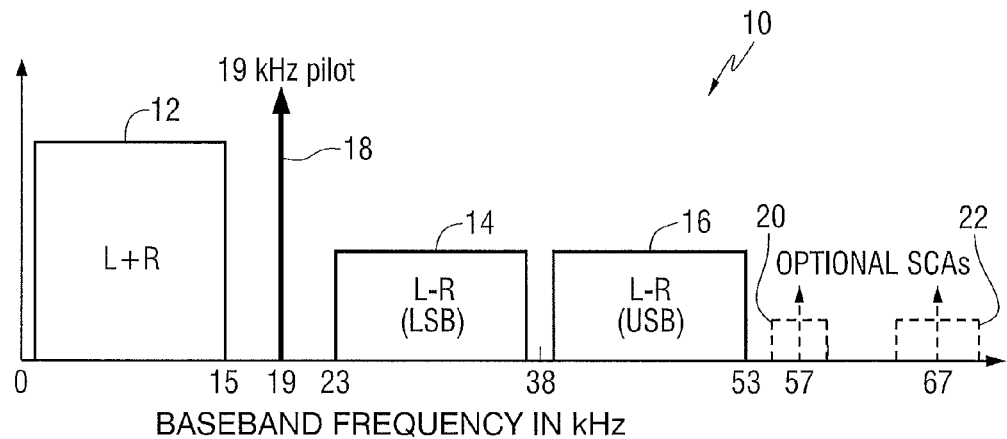
FIG. 1 is a schematic diagram of the FM baseband multiplex signal.

To understand the context of the invention, it is instructive to review a conventional analog FM signal and an FM receiver. Prior to frequency modulation at the transmitter, an FM stereo multiplex signal is generated. A spectral representation of an FM baseband multiplex signal 10 is presented in FIG. 1. The monophonic signal includes Left plus Right (L+R) components 12 (also called the sum component) that reside at baseband from near zero up to 15 kHz. The stereo difference signal component (L−R) is modulated (Double-Sideband Suppressed Carrier, DSBSC) at 38 kHz, forming an L−R lower sideband 14 and an L−R upper sideband 16. A pilot signal 18 is placed at 19 kHz, coherent with half the 38 kHz subcarrier. This aids in demodulation at the receiver. Optional Subsidiary Communications Authorization (SCA) signals for auxiliary services 20 and 22 may also be included.

Notice that the stereo audio components of this signal extend to 53 kHz. The optional SCAs are also shown for informational purposes only, but may be affected by the bandwidth reduction methods discussed later.

Figure 2:
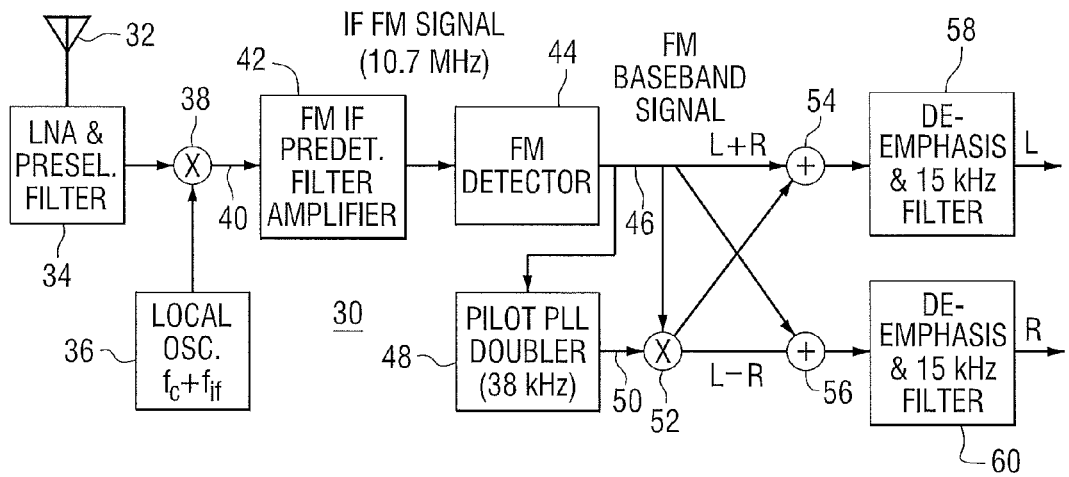
FIG. 2 is a simplified functional block diagram of a conventional FM receiver with a stereo multiplex decoder.

A simplified functional diagram of a conventional FM stereo receiver 30 is shown in FIG. 2. A signal received on antenna 32 enters the low noise amplifier (LNA) and pre-selection filter 34 to bring the signal sufficiently above the noise floor of the subsequent components, while eliminating most unwanted signals. The local oscillator (LO) 36 and mixer 38 translate the signal frequency to a nominal IF (typically 10.7 MHz) on line 40 for subsequent FM detection in the FM predetection filter/amplifier 42 and the FM detector 44 to output the FM baseband multiplex signal on line 46. The 19-kHz pilot is recovered via a phase-locked loop (PLL) 48, where it is doubled in frequency to produce the coherent 38-kHz subcarrier on line 50. The 38-kHz subcarrier is used to demodulate the L−R signal via multiplier 52. Next, the sum (L+R) and difference (L−R) signal components are dematrixed using summation points 54 and 56. The resulting Left and Right audio signals are then bandlimited to 15 kHz and de-emphasized in blocks 58 and 60 to produce the Left and Right audio output signals.

It is important that the relative levels of the sum (L+R) and difference (L−R) signal components are accurately maintained to preserve stereo separation. For example, if they are imbalanced by 1 percent, then the stereo separation is limited to 40 dB. The selectivity of the FM intermediate frequency (IF) predetection filter can be adjusted to accommodate the interference conditions. Furthermore, the L−R signal into the dematrix can be suppressed to further reduce the noise added by the stereo L−R component. Well-designed receivers will adaptively adjust both the predetection and postdetection bandwidths, and "blend out" the L−R signal to improve the compromise between postdetection noise and audio fidelity in the presence of noise or interference.

IBOC DAB Waveforms

IBOC DAB signals can be transmitted in both AM and FM radio bands, using a variety of waveforms. The waveforms include hybrid FM IBOC DAB waveforms and an FM all-digital IBOC DAB waveform.

Figure 3:
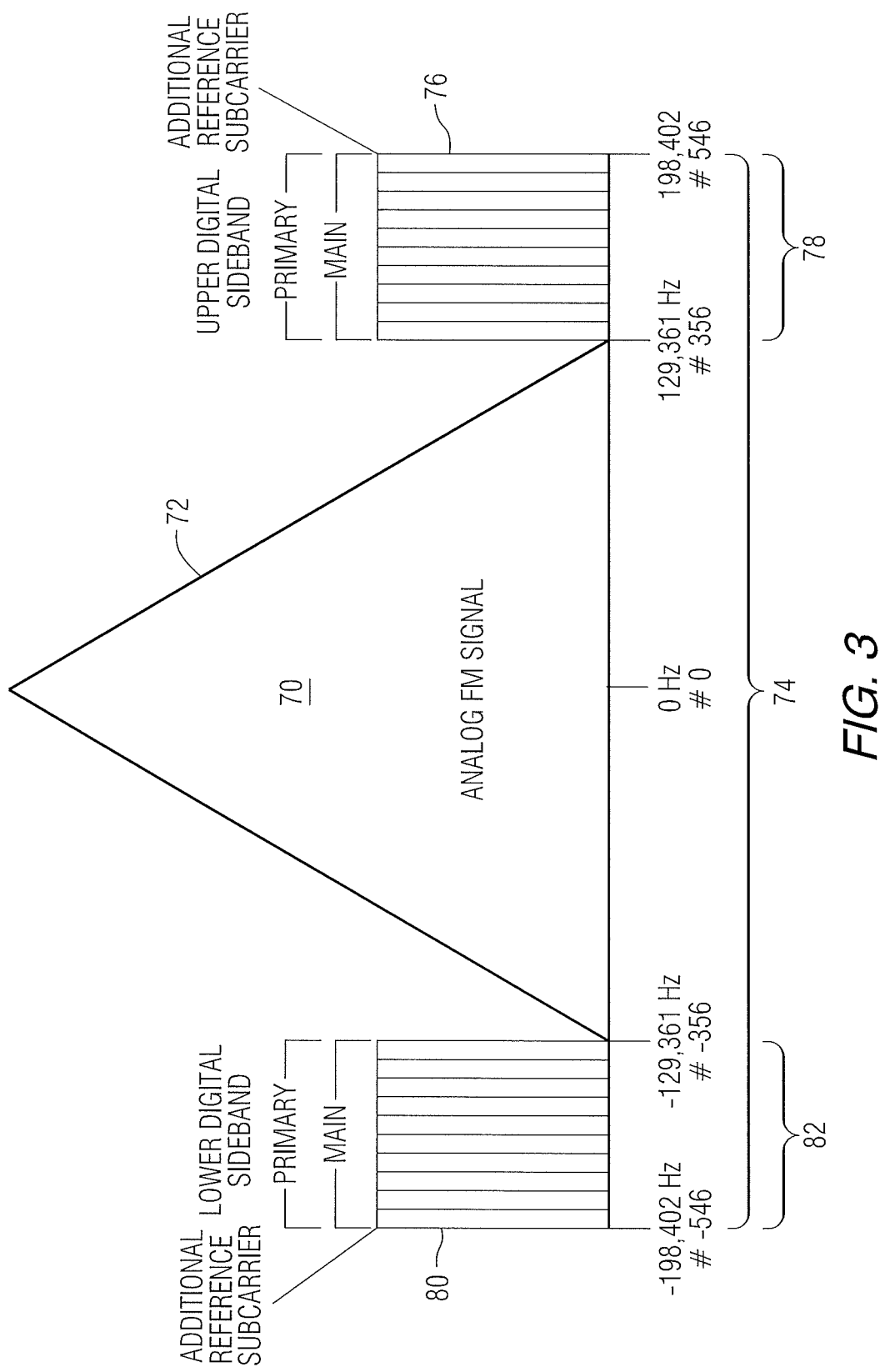
FIG. 3 is a schematic representation of a hybrid FM IBOC waveform.

FIG. 3 is a schematic representation of a hybrid FM IBOC waveform 70. The waveform includes an analog modulated signal 72 located in the center of a broadcast channel 74, a first plurality of evenly spaced orthogonally frequency division multiplexed subcarriers 76 in an upper sideband 78, and a second plurality of evenly spaced orthogonally frequency division multiplexed subcarriers 80 in a lower sideband 82. The digitally modulated subcarriers are divided into partitions and various subcarriers are designated as reference subcarriers. A frequency partition is a group of 19 OFDM subcarriers containing 18 data subcarriers and one reference subcarrier.

The hybrid waveform includes an analog FM-modulated signal, plus digitally modulated primary main subcarriers. The subcarriers are located at evenly spaced frequency locations. The subcarrier locations are numbered from −546 to +546. In the waveform of FIG. 3, the subcarriers are at locations +356 to +546 and −356 to −546. Each primary main sideband is comprised of ten frequency partitions. Subcarriers +546 and −546, also included in the primary main sidebands, are additional reference subcarriers. The amplitude of each subcarrier can be scaled by an amplitude scale factor.

Figure 4:
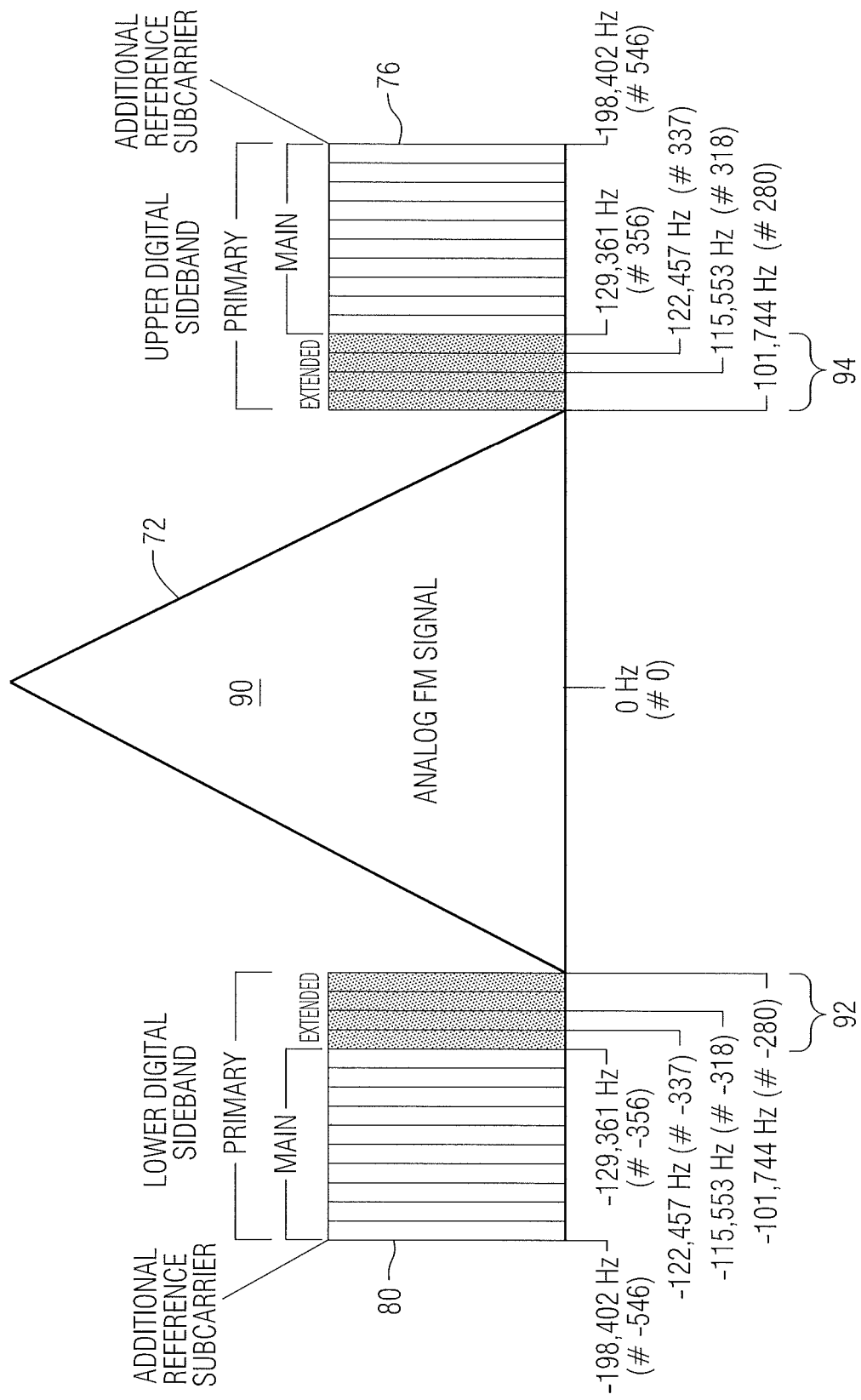
FIG. 4 is a schematic representation of another hybrid FM IBOC waveform.

FIG. 4 is a schematic representation of an extended hybrid FM IBOC waveform 90. The extended hybrid waveform is created by adding primary extended sidebands 92, 94 to the primary main sidebands present in the hybrid waveform of FIG. 3. One, two, or four frequency partitions can be added to the inner edge of each primary main sideband. The extended hybrid waveform includes the analog FM signal plus digitally modulated primary main subcarriers (subcarriers +356 to +546 and −356 to −546) and some or all primary extended subcarriers (subcarriers +280 to +355 and −280 to −355).

The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 5:
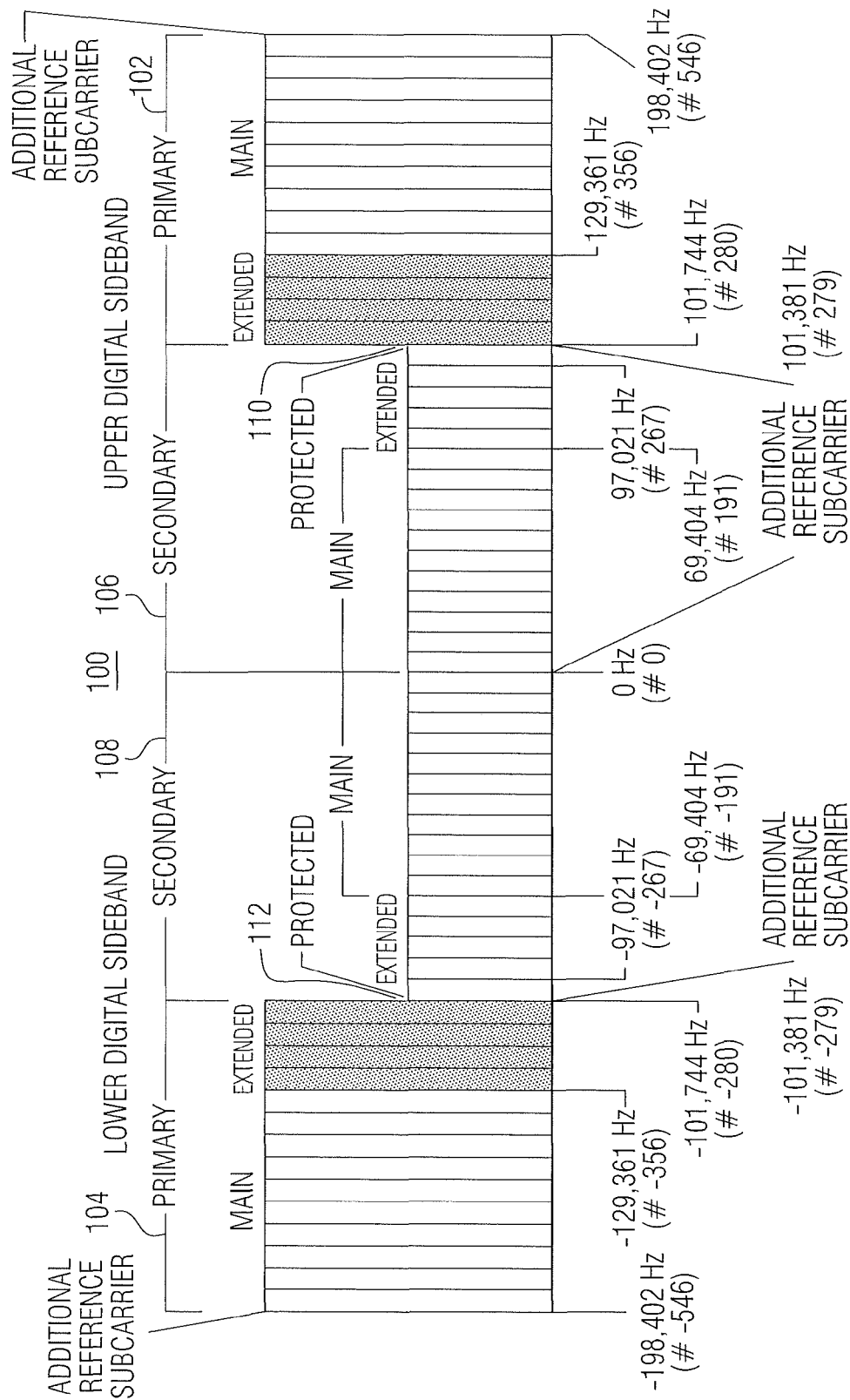
FIG. 5 is a schematic representation of an all-digital FM IBOC waveform.

FIG. 5 is a schematic representation of an all-digital FM IBOC waveform 100. The all-digital waveform is constructed by disabling the analog signal, fully expanding the bandwidth of the primary digital sidebands 102, 104, and adding lower-power secondary sidebands 106, 108 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has ten secondary main (SM) and four secondary extended (SX) frequency partitions. Unlike the primary sidebands, however, the secondary main frequency partitions are mapped nearer to the channel center with the extended frequency partitions farther from the center.

Each secondary sideband also supports a small secondary protected (SP) region 110, 112 including 12 orthogonal frequency division multiplexing (OFDM) subcarriers and reference subcarriers 279 and −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each secondary main sideband spans subcarriers 1 through 190 or −1 through −190. The upper secondary extended sideband includes subcarriers 191 through 266, and the upper secondary protected sideband includes subcarriers 267 through 278, plus additional reference subcarrier 279. The lower secondary extended sideband includes subcarriers −191 through −266, and the lower secondary protected sideband includes subcarriers −267 through −278, plus additional reference subcarrier −279. The total frequency span of the entire all-digital spectrum is 396,803 Hz. The amplitude of each subcarrier can be scaled by an amplitude scale factor. The secondary sideband amplitude scale factors can be user selectable. Any one of four may be selected for application to the secondary sidebands.

In each of the waveforms, the digital signal is modulated using orthogonal frequency division multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

In the hybrid waveform, the digital signal is transmitted in primary main (PM) sidebands on either side of the analog FM signal in the hybrid waveform. The power level of each sideband is appreciably below the total power in the analog FM signal. The analog signal may be monophonic or stereo, and may include subsidiary communications authorization (SCA) channels.

In the extended hybrid waveform, the bandwidth of the hybrid sidebands can be extended toward the analog FM signal to increase digital capacity. This additional spectrum, allocated to the inner edge of each primary main sideband, is termed the primary extended (PX) sideband.

In the all-digital waveform, the analog signal is removed and the bandwidth of the primary digital sidebands is fully extended as in the extended hybrid waveform. In addition, this waveform allows lower-power digital secondary sidebands to be transmitted in the spectrum vacated by the analog FM signal.

Noise and Interference Issues

A brief summary of the noise and interference issues is described next. Noise can be characterized as additive white Gaussian noise (AWGN), such as thermal noise at the front end of the receiver, or background noise. This noise is spectrally flat entering the predetection filter in the receiver. FM detection of the baseband signal in the presence of AWGN results in a non-flat output noise spectrum, where the postdetection noise density is proportional to the square of the frequency from zero Hz. For example, the postdetection noise density at 15 kHz is 225 times (23.5 dB greater than) the noise density at 1 kHz. This degradation is mitigated by de-emphasis of the output audio signal in the receiver for monophonic reception. Unfortunately, this de-emphasis is not as effective for the stereo L−R signal centered at 38 kHz. The noise density centered at 38 kHz is a factor of 1444 (31.6 dB) greater than the noise density at 1 kHz, while the noise at 53 kHz is a factor of 2809 (34.5 dB) greater. It can be shown that the noise contributed by the upper sideband (USB) in the 38 to 53 kHz range is 3.4 dB greater than the lower sideband (LSB) noise from 23 to 38 kHz.

FM transmitter simulations have been performed with the L and R audio components comprised of filtered Gaussian noise with 30% modulation, typical of audio processing in an FM system. The audio Gaussian noise was filtered with a linear taper in frequency from 0 dB near 0 Hz to −12 dB at 15 kHz, to simulate a typical audio spectral characteristic. The input audio stereo separation was set at 50%, meaning that 50% of the signal was common in both the L and R components, while the remaining 50% was uncorrelated.

Figure 6:
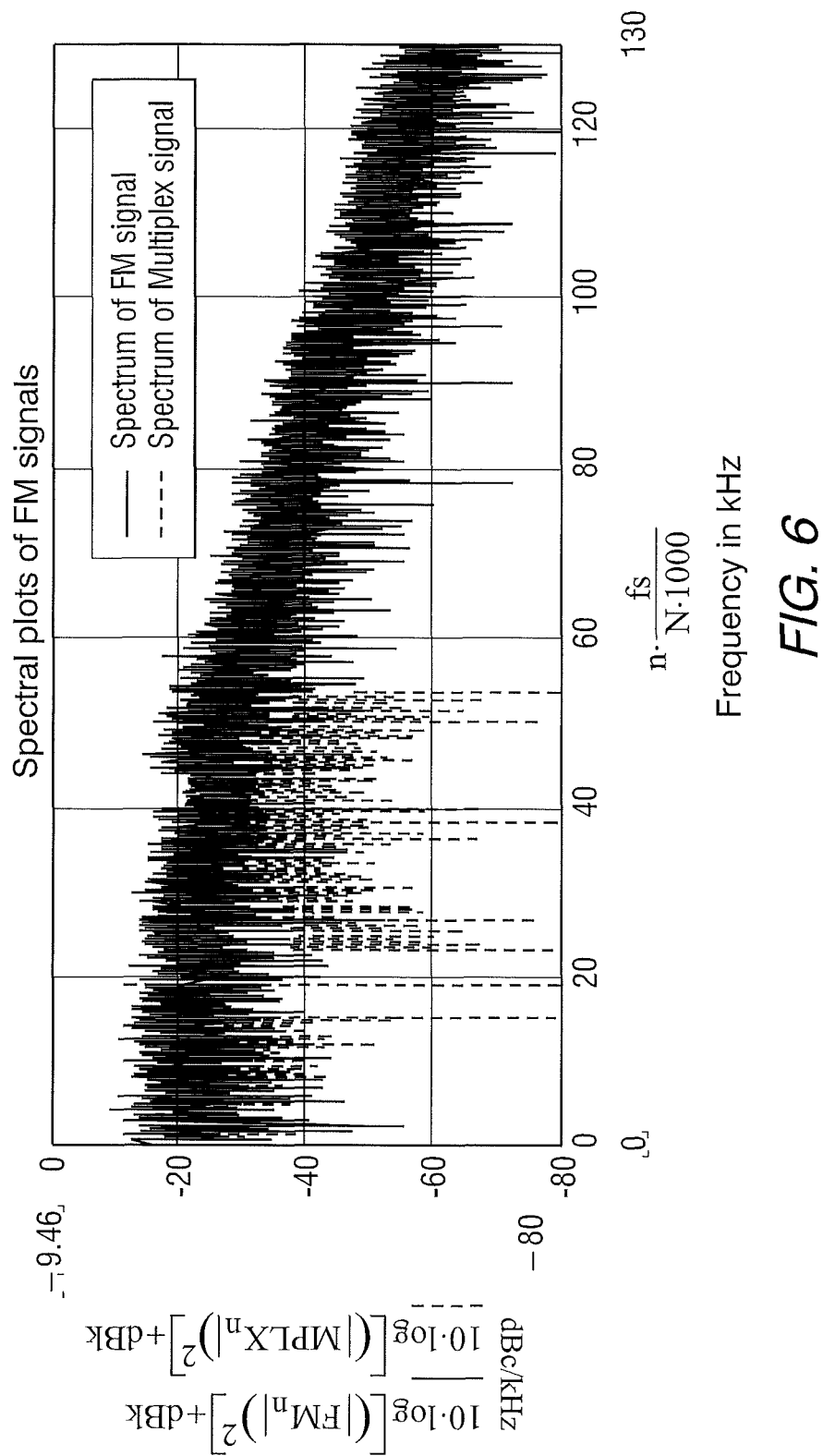
FIG. 6 shows spectral plots (one-sided) of an actual transmitted FM signal and its input baseband multiplex signal.

FIG. 6 shows spectral plots (one-sided) of an actual transmitted FM signal and its input baseband multiplex signal. FIG. 6 shows a one-sided (positive frequencies only) spectral representation illustrating the spectral compactness of the simulated baseband multiplex signal to 53 kHz, while the frequency-modulated output extends well beyond that. The spectral components of the FM output signal beyond 100 kHz are of special interest here since these components affect the extended digital subcarriers in the extended hybrid modes of an IBOC DAB waveform.

Predetection Filter

Predetection filter characteristics play an important role in receiver performance. The predetection filter affects stereo separation and audio distortion. Since predetection filter bandwidth determines how much noise enters the FM detector, it also affects sensitivity. Perhaps most importantly, bandwidth control can reduce interference from first-adjacent signals and the digital subcarriers of its own hybrid IBOC sidebands. Since subcarriers in the extended hybrid mode can be as close as ±101 kHz from FM center frequency, it is important that the filter has adequate stopband attenuation beyond about 100 kHz. This filter should also have linear phase (e.g., FIR) and be flat over the passband up to about ±90 kHz, corresponding to 120% modulation. Typical analog ceramic IF filters have a significantly wider bandwidth than digital filters, to minimize distortion and accommodate tolerances and group-delay variations due to their nonlinear phase characteristic.

Efficient Filter Design

Although primarily interested in FM predetection filter characteristics, a typical IBOC receiver design would also accommodate the digital sidebands in an efficient architecture. Efficient implementation of isolation filters, and decimation to minimum sample rates, can reduce subsequent processing requirements and save power. Recognition of some complementary characteristics of these filters is crucial to realizing the efficient design opportunity. The fortuitous combination of input sample rate, bandwidths, and locations of the analog FM signal and digital sidebands, along with the decimate-by-4 frequencies, offers a convenient filter architecture.

Figure 7:
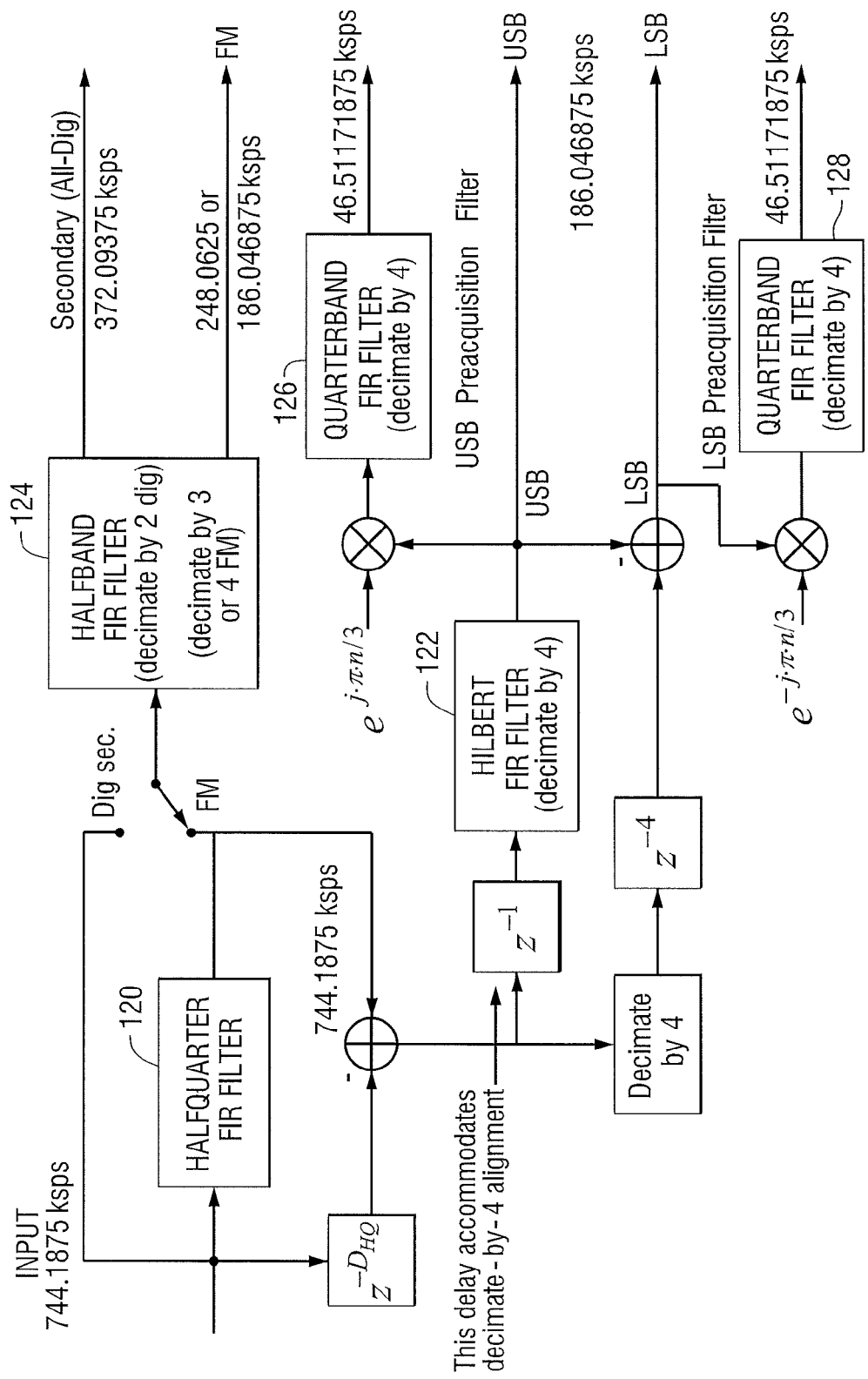
FIG. 7 is a functional block diagram of isolation filters.

This unique set of characteristics allows exploitation of an input filter having both halfband and quarterband symmetries. FIG. 7 is a functional block diagram of pre-detection isolation filters.

The "halfquarter" filter 120 establishes the locations of all the transition bands between the passband and stopband of the filter. This is followed by an efficient halfband Hilbert-transform filter 122 to separate the upper and lower digital sidebands, and another similar halfband filter 124 to separate and reduce the sample rate of the analog FM signal. An upper sideband preacquistion filter 126 and a lower sideband preacquisition filter 128 are also included. In FIG. 7, all signals are complex, and all filters are real, except the Hilbert FIR filter.

Only those filters comprising the analog FM predetection filter, i.e., the halfquarter and analog halfband FIR filters, are described in the following sections.

The halfquarter filter efficiently establishes the transition bands for the signal components. Its special symmetry results in nonzero coefficients at every fourth filter coefficient, a very efficient structure.

Integer versions of the filter coefficients are presented in Table 1, showing only one-sided coefficients starting at center index 0 through 58. These integer coefficients would be multiplied by $2^{-15}$ for a unity passband DC gain. The negative-indexed coefficients are equal to the positive-indexed coefficients. Although this filter has 117 coefficients, only 31 are nonzero. The symmetry of the upper and lower halves can be further exploited to halve the number of multiplies, after folding and adding the input signal samples. Then only 32 real multiplies per sample are needed to filter the complex input signal.

TABLE 1

Positive-Indexed Coefficients of Halfquarter Filter
Coefficients 0 through 58 of Halfquarter Filter, Starting with Center Coefficient

| Index | Coefficient |
|---|---|
| 0 | 16384 |
| 1 | 0 |
| 2 | 10396 |
| 3 | 0 |
| 4 | 0 |
| 5 | 0 |
| 6 | −3374 |
| 7 | 0 |
| 8 | 0 |
| 9 | 0 |
| 10 | 1919 |
| 11 | 0 |
| 12 | 0 |
| 13 | 0 |
| 14 | −1263 |
| 15 | 0 |
| 16 | 0 |
| 17 | 0 |
| 18 | 879 |
| 19 | 0 |
| 20 | 0 |
| 21 | 0 |
| 22 | −624 |
| 23 | 0 |
| 24 | 0 |
| 25 | 0 |
| 26 | 442 |
| 27 | 0 |
| 28 | 0 |
| 29 | 0 |
| 30 | −309 |
| 31 | 0 |
| 32 | 0 |
| 33 | 0 |
| 34 | 210 |
| 35 | 0 |
| 36 | 0 |
| 37 | 0 |
| 38 | −138 |
| 39 | 0 |
| 40 | 0 |
| 41 | 0 |
| 42 | 85 |
| 43 | 0 |
| 44 | 0 |
| 45 | 0 |
| 46 | −49 |
| 47 | 0 |
| 48 | 0 |
| 49 | 0 |
| 50 | 25 |
| 51 | 0 |
| 52 | 0 |
| 53 | 0 |
| 54 | −11 |
| 55 | 0 |
| 56 | 0 |
| 57 | 0 |
| 58 | 4 |

Figure 8:
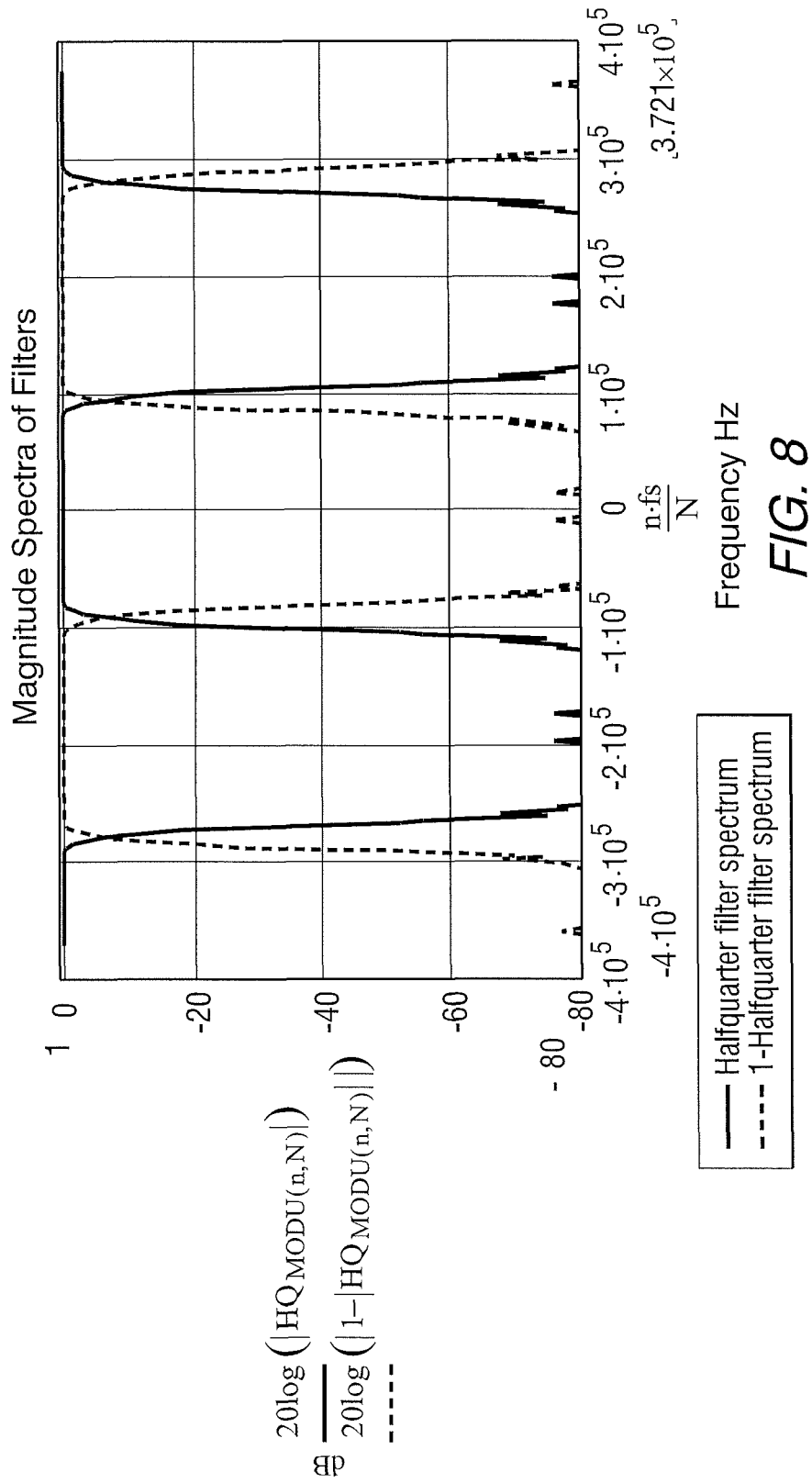
FIG. 8 is a halfquarter filter spectrum.

The magnitude spectrum of the halfquarter filter and its complement (1-halfquarter) are shown in FIG. 8. The plot shows the response over the Nyquist bandwidth for the complex sample rate fs=744.1875 kHz. Notice that the baseband passband spans the quarterband bandwidth ±fs/8, from −93 kHz to +93 kHz. This band carries the analog FM signal.

The pair of quarterband bandwidths carrying the digital sidebands is created from the complement of the halfquarter filter, from 93 kHz to 279 kHz on either side of center frequency. These digital sidebands accommodate the extended subcarriers and additional bandwidth required for a first-adjacent cancellation (FAC) operation. The three quarterband passbands, for analog FM and the pair of digital sidebands, are easily and efficiently separated with subsequent filters, due to the large transition bandwidths between passbands of the halfquarter filter.

Halfband Filter for Analog FM

The halfband filter efficiently captures the analog FM signal from the output passband of the halfquarter filter. The spectrum of this filter has halfband symmetry, with alternating coefficients equal to zero. Integer versions of these filter coefficients are presented in Table 2, showing only one-sided coefficients starting at center coefficient index 0 through 15. These integer coefficients would be multiplied by $2^{-15}$ for a unity passband gain. The negative-indexed coefficients are equal to the positive-indexed coefficients.

TABLE 2

Positive-Indexed Coefficients of Halfband Analog FM Filter Coefficients 0 through 15 of Halfband Filter, Starting with Center Coefficient

| | |
|---|---|
| 0 | 16384 |
| 1 | 10292 |
| 2 | 0 |
| 3 | −3080 |
| 4 | 0 |
| 5 | 1479 |
| 6 | 0 |
| 7 | −741 |
| 8 | 0 |
| 9 | 343 |
| 10 | 0 |
| 11 | −131 |
| 12 | 0 |
| 13 | 34 |
| 14 | 0 |
| 15 | −4 |

Figure 9:
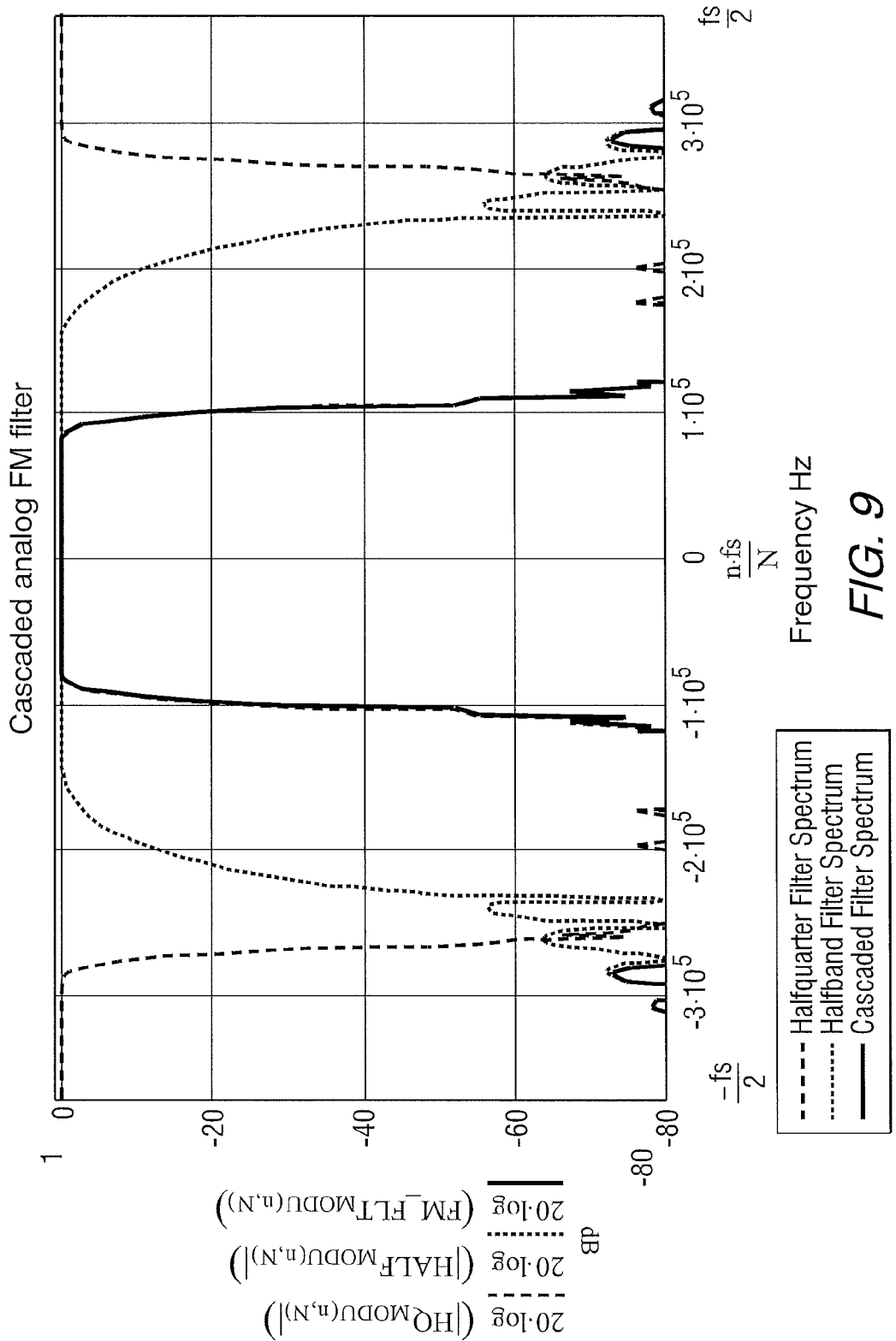
FIG. 9 shows the frequency response of an analog FM filter created from the cascade of halfquarter and halfband filters.

The magnitude spectrum of the analog FM filter created from the cascade of halfquarter and halfband filters is shown in FIG. 9. The plots show the undecimated responses over the Nyquist bandwidth for the complex input sample rate fs=744.1875 kHz, although only the decimated FM output is computed (for efficiency). These plots include the output spectrum of the halfquarter filter, the spectrum of the halfband filter, and the FM filter resulting from the cascade of the halfquarter and halfband filters. Notice that the baseband 6-dB passband spans the quarterband bandwidth ±fs/8, from −93 kHz to +93 kHz. This band carries the analog FM signal.

Figure 10:
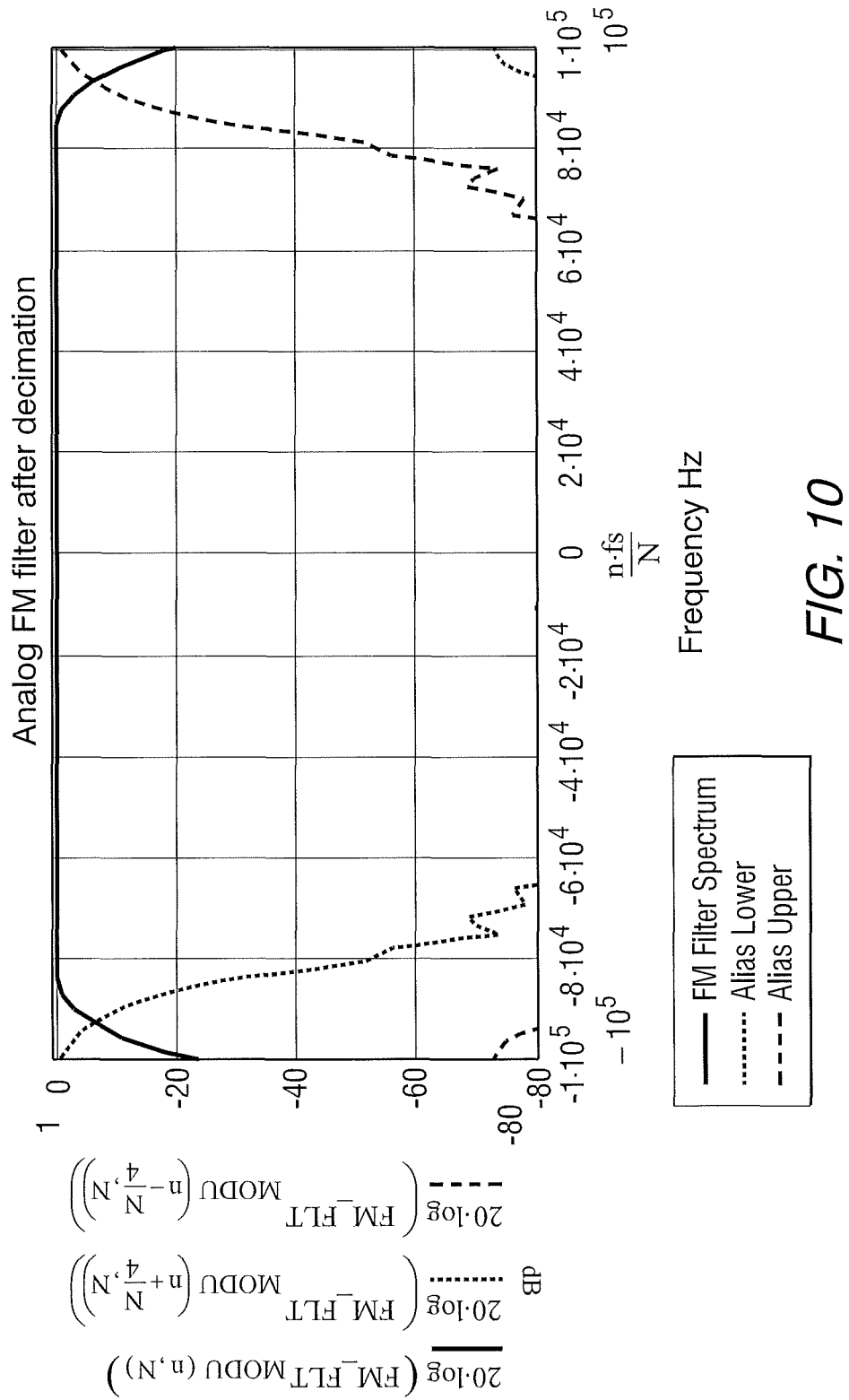
FIG. 10 is a decimated output of the analog FM filter showing passband spectrum and aliasing due to decimation by 4.

The output sample rate of the halfband filter may be one-third or one-quarter of the input sample rate. Decimation by 4, for instance, results in very efficient filtering of the FM signal, but also introduces some aliasing, as shown in the magnitude spectrum of the halfband filter in FIG. 10. In a separate analysis, outside the scope of this description, these aliasing effects were evaluated and shown to be acceptable for FM demodulation performance. Notice that the 6-dB frequencies (±93 kHz) of the filter occur at ±½ the output sample rate, or the Nyquist bandwidth.

Decimation by 3 for this filter avoids aliasing at the extremes of the passband created by the decimation by 4; however, the complex output sample rate is 248.0625 ksps instead of 186.046875 ksps, increasing the MIPS requirement for subsequent FM demodulation.

FM Demodulator

The FM demodulator described herein is suitable for demodulating an FM analog signal (no digital components) and does not require that the received signal be an IBOC signal. However, it is also effective in suppressing the interference of a first-adjacent IBOC interference signal (its digital sideband).

Figure 11:
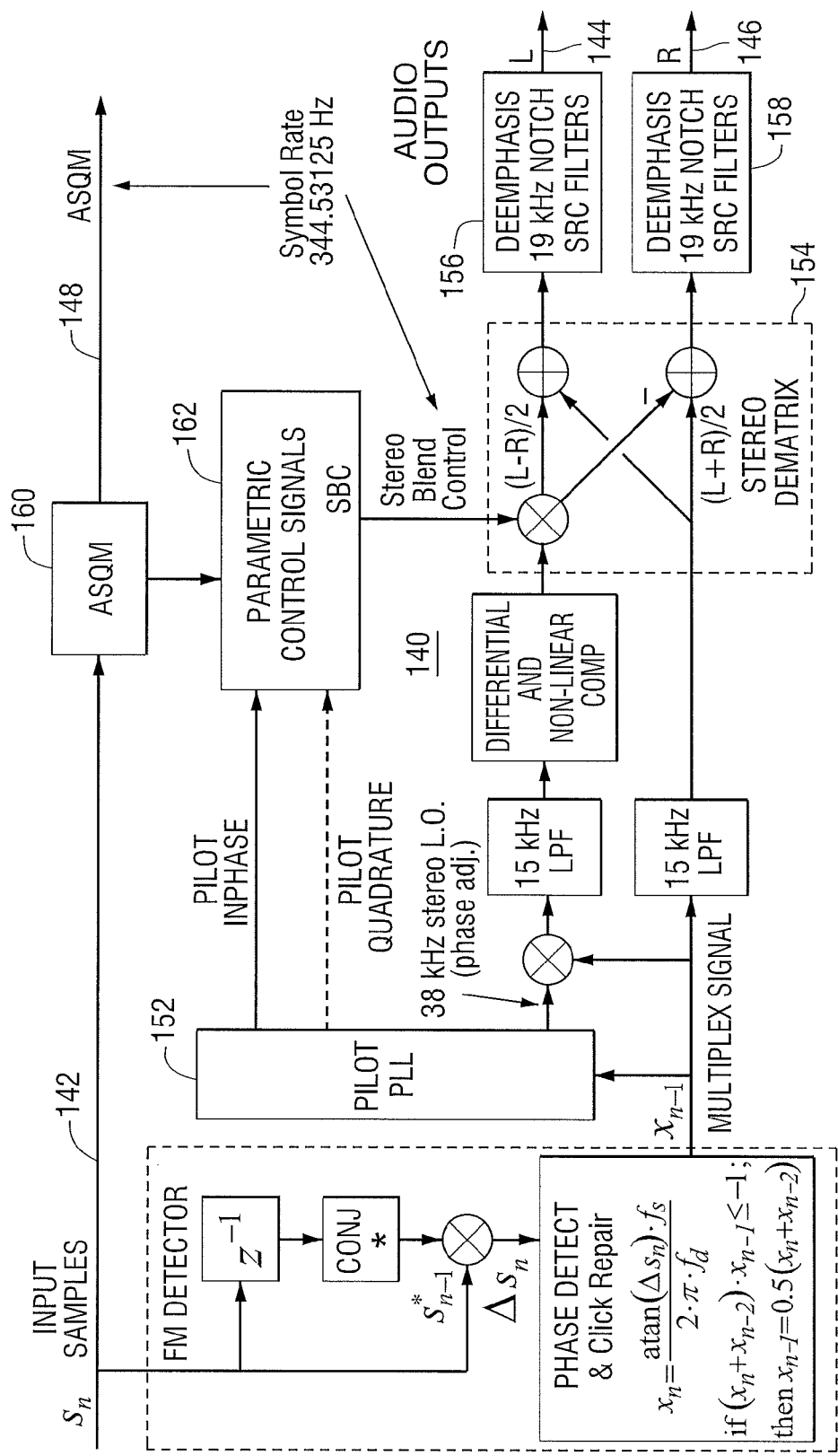
FIG. 11 is an FM demodulator functional block diagram.

A functional block diagram of the FM demodulator 140 is shown in FIG. 11. The input 142 is the complex baseband signal from the FM predetection filter, sampled at either approximately 186 kHz or 248 kHz. The outputs 144 and 146 include the left and right audio samples at 46.5 kHz (or sample-rate-converted to 44.1 kHz), and an FM Analog Signal Quality Metric (ASQM) 148 for other uses such as additional audio processing or antenna diversity. The major components of the FM demodulator include the FM detector 150, pilot PLL 152, stereo dematrixing 154, de-emphasis filtering 156, 158, ASQM 160, and parametric control 162 for the blend-to-mono function.

Several uncommon features designed to enhance the performance of the FM demodulator include compensation for the FM differential (instead of derivative) detector, nonlinear compensation, "click repair," pilot parametric control signals, and the use of ASQM for the blend-to-mono metric. The latter feature is especially important to mitigate first-adjacent IBOC digital sideband interference in areas near first-adjacent transmitters (spaced 200 kHz from the desired FM signal).

The advantages of a lower sample rate and predetection bandwidth include reduced computational load, lower predetection noise, immunity to first-adjacent interference, and elimination of digital sideband interference to its analog FM host signal. Thus, especially for hybrid FM IBOC signals, it would be advantageous to use a lower sample rate (i.e., 186 kHz) and a lower predetection bandwidth. As described below, this FM demodulator addresses the following issues associated with lower sample rates:

1. Reduced stereo separation due to non-ideal approximation of the derivative with a differential, and/or non-flat predetection filtering.
2. Increased distortion (THD) associated with lower predetection filter bandwidth.
3. Increased probability of modulo overflow with reduced sample rate, resulting in a one-sample click.
4. Increased aliasing associated with reduced sample rate (Nyquist bandwidth). While this problem could be eliminated by increasing the sample rate (e.g., 248 kHz instead of 186 kHz), that would increase processing requirements, and simulation results indicate that the aliasing at 186 kHz is not a significant problem.

FM Detection

FM detection is ideally accomplished by computing the continuous derivative of the phase of the predetection signal. For digitally-implemented receivers, FM detection can be approximated by computing the angle between successive complex signal samples, which is the phase difference. It is convenient to first conjugate multiply each pair of successive samples $s_n$ and $s_{n-1}$, then compute the angle over ±π of the result to get $x_n$. The angle is the difference in phase between successive complex FM input samples. After proper scaling (described below), it represents the demodulated baseband multiplex signal.

Appropriate scaling is applied to the resulting angle for the sample rate $f_s$ and 100% deviation $f_d$. Then the FM baseband multiplex signal $x_n$ has a range of ±1 with 100% modulation or frequency deviation. This can be computed as:

$$\Delta s_n = s_n \cdot s_{n-1}^*$$
$$x_n = \frac{\mathrm{atan}(\Delta s_n) \cdot fs}{2 \cdot \pi \cdot f_d}$$

Differential and Non-Linear Compensation

The approximation of the derivative of the phase by the phase difference of consecutive samples results in an error seen in the non-flat frequency response of the differentiator output. This error is increased as the sample rate fs is reduced. The frequency response of the derivative function is:

derivative(f)=2·π·f.

The frequency response of the difference function is:

$$diff(f, fs) = fs \cdot |1 - e^{-j \cdot 2\pi \cdot f/fs}| = 2 \cdot fs \cdot \sin\left(\frac{\pi \cdot f}{fs}\right)$$

Figure 12:
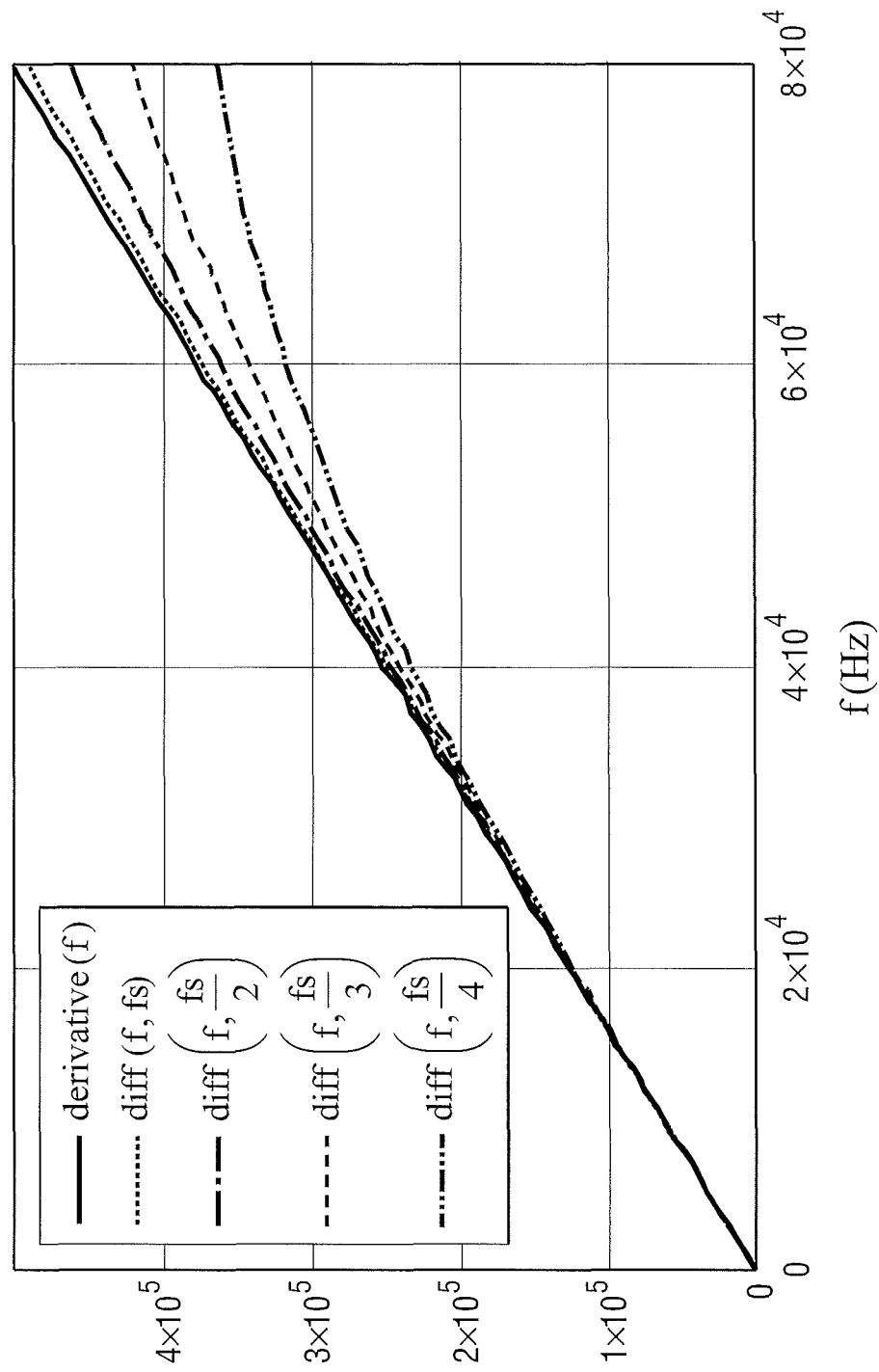
FIG. 12 is a comparison of the linear frequency response of an ideal derivative function to the difference function for several sample rates.

The plot of FIG. 12 compares the linear frequency response of an ideal derivative function to the difference function over a range of instantaneous frequencies f (horizontal axis) for several sample rates. The sample rate fs=744.1875 kHz, while the decimated sample rates include the lowest of fs/4=186.046875 kHz.

It is clear from the plots of FIG. 12 that the lower the sample rate, the more roll-off occurs at the higher frequencies. One straightforward method of fixing this is to apply a compensation FIR filter to counteract the gain droop at the higher frequencies in the FM baseband multiplex signal; however, this may be costly in terms of processing requirements.

Since the droop over the monophonic (L+R) bandwidth (from 0 to 15 kHz) appears negligible, it may not be necessary to compensate this portion of the signal. Subsequent measurements indicate that the Total Harmonic Distortion (THD) is very good without monophonic compensation, and its distortion is very small.

The stereo difference signal (L−R) is located in the bandwidth from 23 to 53 kHz, where noticeable gain droop occurs. FM stereo receivers rely on accurate (relative) levels of the sum (L+R) and difference (L−R) signals for good stereo separation after matrix decoding (dematrixing). The strategy applied here is to compensate the gain loss in the difference (L−R) signal path with a constant gain.

Although the slope of the gain over the 23 to 53 kHz region of the L−R signal is not linear, it can be approximated as a linear function resulting in a flat passband in the DSBSC demodulated output signal. Any deviations from linear result in variation of stereo separation across the audio bandwidth. So the gain can be accurately compensated for maximum stereo separation at a single frequency (e.g., at 1 kHz on either side of the 38 kHz subcarrier), assuming slight variations in stereo separation are acceptable over the audio bandwidth. Since stereo separation is measured at an audio frequency of 1 kHz (where humans are sensitive), it makes sense to compensate the gain for that frequency. Since the differential gain droop is nearly linear over a range of audio frequencies (±1 kHz) about 38 kHz, the gain can be compensated at 38 kHz. The linear droop compensation can be computed at various decimation factors D=1, 2, 3, or 4. For example, $$compdroop(f, fs) = \frac{\pi \cdot f}{fs \cdot \sin\left(\frac{\pi \cdot f}{fs}\right)}$$

compdroop(38000, fs) = 1.004
compdroop(38000, fs/2) = 1.017
compdroop(38000, fs/3) = 1.04
compdroop(38000, fs/4) = 1.072

Limiting the bandwidth of the predetection filter can also cause nonlinear distortion in the difference (L−R) signal. Since an FM signal has a theoretically infinite bandwidth, any bandlimiting results in nonlinear distortion. Although a wideband predetection filter can be used, this should be avoided for reasons previously stated. High frequencies that fall out of passband occur primarily when the instantaneous frequency deviation is high. This has the effect of soft-limiting the peaks of the difference (L−R) signal. The distortion caused by the soft-limiting effects can be compensated by applying a nonlinear correction to the difference signal. Simulation results have verified that the distortion is approximately quadratic (relative to the instantaneous amplitude of the difference signal), and can be compensated with a complementary quadratic function.

The flat gain droop, as well as the nonlinear distortion, can be compensated with the following function:

$$x_n = x_n \cdot (compdroop + compnonlin \cdot x_n^2),$$

where $x_n$ is a sample of the difference (L−R) signal, and compdroop and compnonlin are constants determined by the sample rate. These compensation coefficients may need further adjustment if different filters are used in place of the example design. No compensation is needed at high sample rates, so compdroop=1 and compnonlin=0 in that case. For the rates in this receiver example:

fs=744.1875 kHz;
fs; $x_n = x_n \cdot (1.004 + 0.21 \cdot x_n^2)$
fs/2; $x_n = x_n \cdot (1.017 + 0.25 \cdot x_n^2)$
fs/3; $x_n = x_n \cdot (1.04 + 0.30 \cdot x_n^2)$
fs/4; $x_n = x_n \cdot (1.072 + 0.30 \cdot x_n^2)$ Click Repair Aliasing could occur in the FM detector due to overmodulation when the phase angle between samples produced by conjugate multiplying successive complex input samples is increased above +π or below −π radians. This is due to modulo-2π overflow in the arctangent function. So as the angle reaches and exceeds π, the polarity reversal at the π boundary switches to −π. This is similar to two's complement overflow/underflow. As the instantaneous frequency deviation of the predetection signal approaches ±$f_s$/2, the angle difference approaches ±π, and the potential for modulo overflow exists. Also, with high signal deviations approaching ±π, noise can cause an overflow/underflow condition.

The maximum range of $x_n$ corresponding to ±π is ±1.24 for a sample rate of 186 kHz, corresponding to ±124% modulation. Similarly, the maximum range is ±1.65 (±165% modulation) at the 248-kHz sample rate. Clearly, the probability of exceeding the boundary is reduced at higher sample rates. So a "click repair" feature is more useful at the lower sample rate. It is also important to recognize that a lower sample rate could increase distortion in the output audio signal due to the limited Nyquist bandwidth of the predetection filter (as addressed above).

An effective method to detect and correct the single-sample overflow or underflow condition is described in the following operation following FM detection:

if$(x_n + x_{n-2}) \cdot x_{n-1} \leq -1$, then let $x_{n-1} = 0.5 \cdot (x_n + x_{n-2})$.

This operation observes a sliding "window" of 3 successive samples $x_{n-2}$, $x_{n-1}$, and $x_n$. If the polarity of the center sample $x_{n-1}$ is reversed relative to the sum of the samples on either side, then the left-hand side of the expression is negative. If this negative value is small (e.g., <<1), then this would likely be a normal signal condition at a low signal level, where the signal is crossing zero. However, if the left-hand side of the expression is less than −1, then it is more likely that a large signal has crossed the modulo-2π (±π) boundary. This overflow/underflow condition would result in a large audio click in the output audio signal. In this case the center sample is "repaired" by setting it equal to the average of the adjacent samples.

The threshold value of −1 was verified empirically, although it could be adjusted as a function of the sample rate. Furthermore, the repair expression averaging the samples on either side of the detected click sample could be modified. For example, the adjacent sample with the largest magnitude could replace the average function. The click repair feature was created for the purpose of minimizing the sample rate lower than typically used in digitally-implemented FM receivers; it is not needed if the sample rate is significantly greater than roughly 300 ksps.

Pilot PLL

Figure 13:
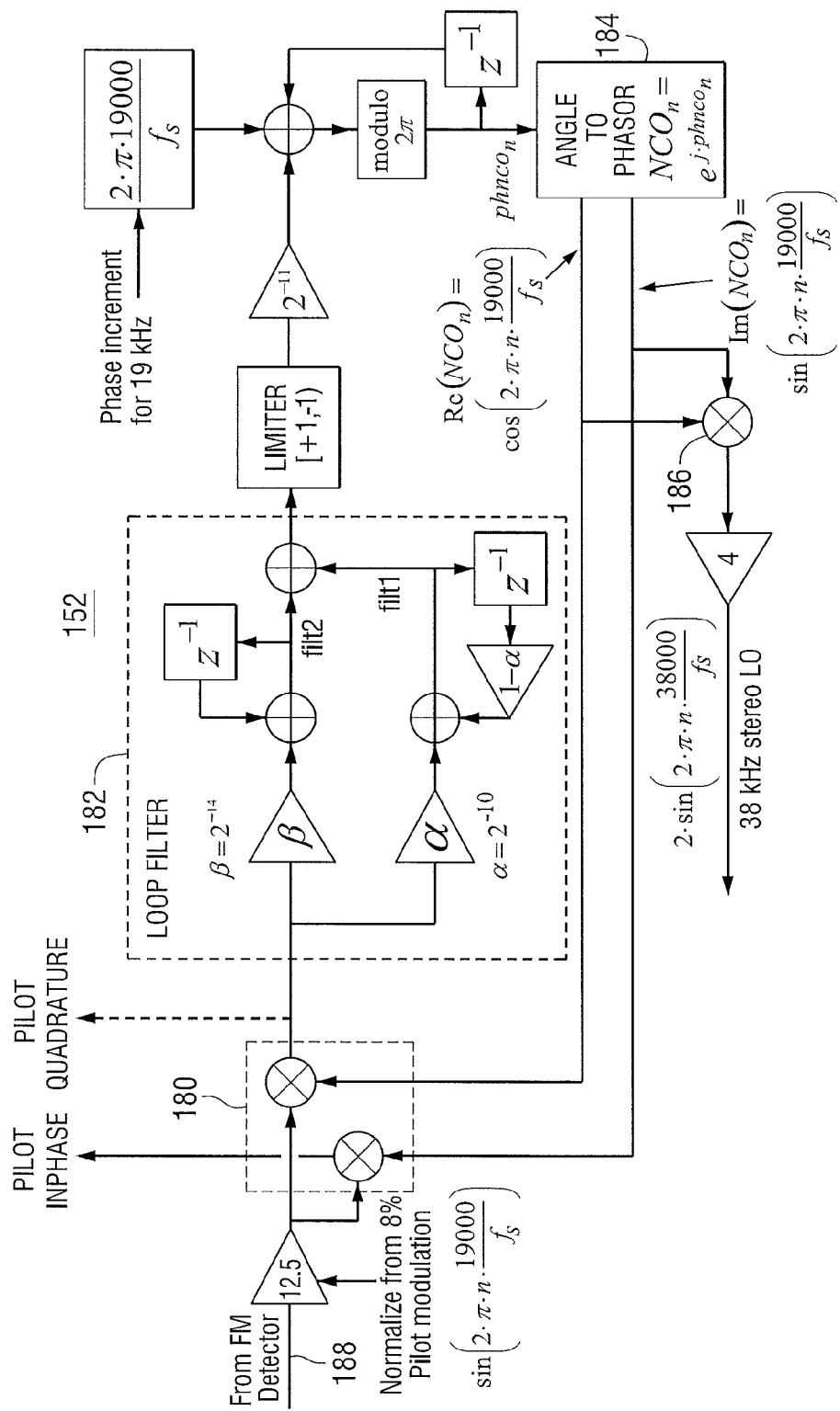
FIG. 13 is a pilot phase locked loop (PLL) for recovery of a stereo subcarrier local oscillator (LO).

The Pilot PLL 152 for recovery of the stereo subcarrier local oscillator (LO) shown in FIG. 13 includes a phase-error detector (complex multiplier) 180, a loop filter 182, and a numerically controlled oscillator (NCO) 184. A frequency doubler 186 is applied to the NCO output to regenerate the 38-kHz stereo-subcarrier local oscillator (LO). The input signal on line 188 is the sequence of complex baseband multiplex samples. The outputs include the 38-kHz stereo-subcarrier LO and the pilot inphase signal for use in the Pilot Parametric Control function. This Pilot PLL feature is somewhat common in FM receivers, so the discussion here is limited.

Parametric Control Signals

Figure 14:
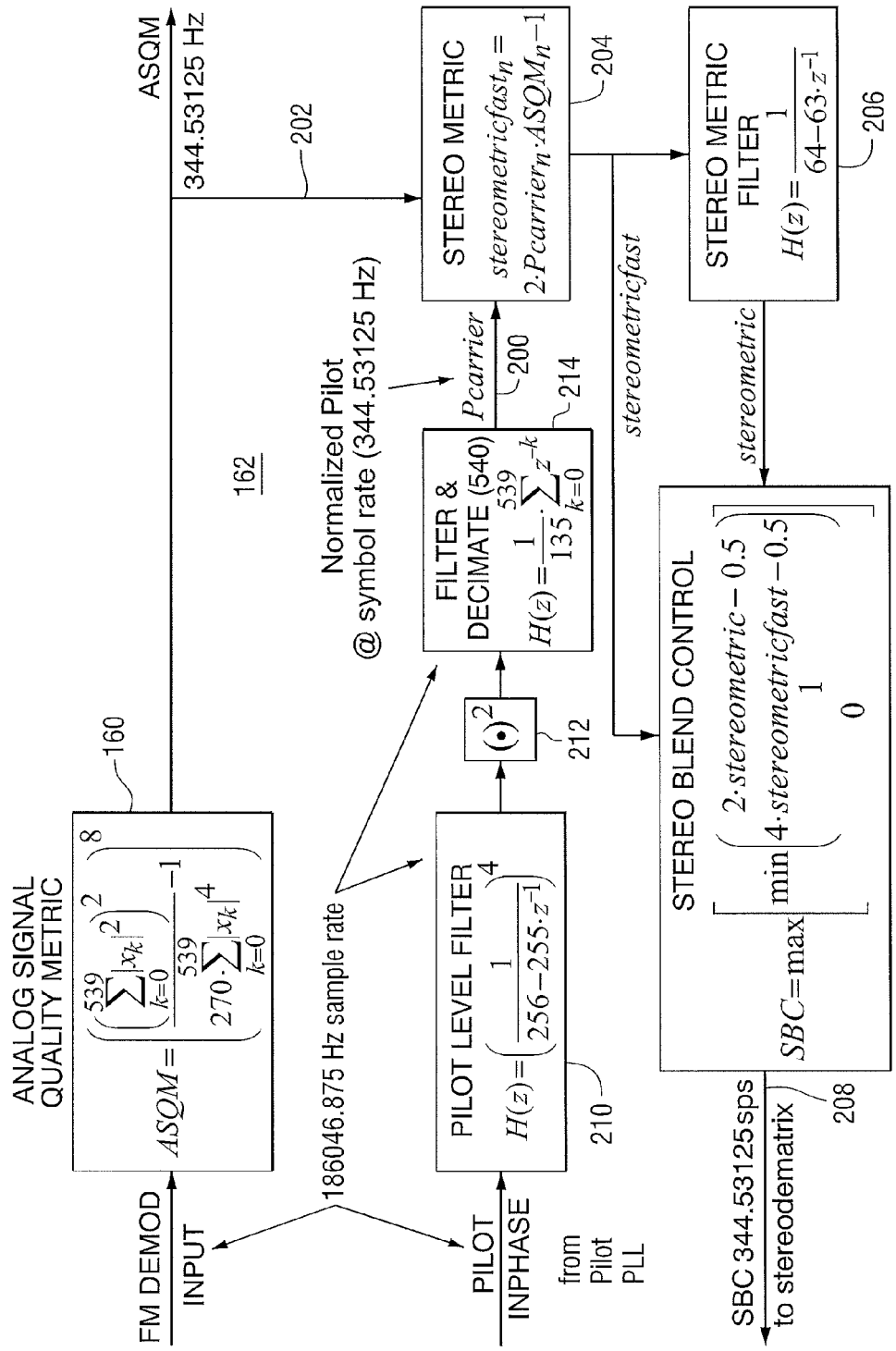
FIG. 14 is a parametric control signal functional block diagram.

The parametric control signals are used to improve audio SNR when the signal is degraded due to noise, interference, or multipath fading. The improvement is realized by blending the stereo signal to monophonic through reduction or elimination of the difference signal in the stereo dematrixing. This is accomplished through an SBC (Stereo Blend Control) signal which weights the L−R component from 0 (no stereo) to 1 (full stereo separation). FIG. 14 is a functional block diagram of the parametric control signals. The SBC value is determined primarily by two parametric signals: the availability of the pilot (Pcarrier) on line 200, and the Analog Signal Quality Metric (ASQM) on line 202. These two parametric signals are combined in the Stereo Metric block 204. The stereo metric is filtered in block 206, and then the SBC on line 208 is formed as a function of both the filtered and unfiltered stereometricfast signal. The SBC function is restricted over a range of zero to one, and it reacts to either the unfiltered stereometricfast or the slower filtered stereometric signal, whichever is lower in value after appropriate scaling and offsets. This allows the SBC to react quickly to a large abrupt signal-quality loss, but react more slowly to a gradual deterioration in signal quality.

The inphase pilot signal is filtered in block 210, followed by a power measurement in block 212, and then filtered again in block 214 to provide a measure of the pilot power Pcarrier, having a normalized range from zero to approximately 1. The ASQM measures the signal quality of the FM predetection signal, as described in the following section. The stereometricfast signal is a function of the product of the ASQM and Pcarrier signals:

stereometricfast=2·Pcarrier·ASQM−1.

ASQM Computation

The ASQM function is an FM analog signal quality metric that can be used for the blend-to-mono function in FM receivers, as well as antenna diversity switching. The ASQM value is computed for blocks of samples. The recommended block size should span about 1 OFDM symbol. This block size is both convenient and practical. It is convenient since some implementations already process signals framed at the symbol rate. The block size is large enough to get a reasonably accurate result, and small enough to accommodate flat fading over the time span.

The ASQM computation exploits the constant modulus property of an FM signal where, in the absence of signal corruption, each sample has a constant magnitude. Both noise and selective fading cause variations in FM sample energies over the symbol span of K samples. The ASQM can also be affected by the bandwidth of the FM preselection filter. The ideal ASQM is based on the ratio between the average (mean) magnitude and the RMS magnitude. This ratio is raised to a power p so that subsequent averaging of ASQM values over time is not biased from a nominal threshold of about 0.5. The greatest slope and an inflection point in the ASQM versus the carrier-to-noise-ratio (C/No) characteristic occur at this threshold. This also provides convenient scaling, similar to other metrics used in the antenna diversity algorithm.

$$ASQM\_ideal = \left(\frac{mean}{rms}\right)^p = \left(\frac{\frac{1}{K} \cdot \sum_{k=0}^{K-1} |x_k|}{\sqrt{\frac{1}{K} \cdot \sum_{k=0}^{K-1} |x_k|^2}}\right)^p = \left(\frac{\sum_{k=0}^{K-1} \sqrt{Re\{x_k\}^2 + Im\{x_k\}^2}}{K \cdot \sum_{k=0}^{K-1} [Re\{x_k\}^2 + Im\{x_k\}^2]}\right)^p.$$

Since the RMS value is the root-sum-square of the average (mean) magnitude and the standard deviation of the magnitude over the symbol time, then the average magnitude per sample is always less than or equal to its RMS value. This property results in an ASQM value between zero and one. When ASQM=1, then there is no signal corruption, and the magnitude is constant. The minimum value of ASQM=$K^{-p/2}$ occurs when there is only one nonzero sample. For convenience, the ideal ASQM computation is modified to avoid square roots in a more practical usage. An exponent value is chosen to accommodate the desired threshold of about 0.5. The modified practical ASQM result behaves similarly to the ideal.

$$ASQM = \left(\frac{\left(\sum_{k=0}^{K-1} [Re\{x_k\}^2 + Im\{x_k\}^2]\right)^2}{K \cdot \sum_{k=0}^{K-1} [Re\{x_k\}^2 + Im\{x_k\}^2]^2}\right)^8.$$

An ASQM value greater than about 0.5 generally indicates good signal quality, with maximum signal quality approaching 1. ASQM values less than 0.5 are indicative of poor signal quality, with the lowest quality approaching 0.

Improved ASQM Computation

The above ASQM computation is based on the ratio of the square of the mean to the mean of the squared values of the signal magnitude-squared. However, since the magnitude is positive and cannot have a zero mean, then the ASQM cannot reach zero. An exponent power of 8 was used to suppress smaller values of the ASQM. It can be shown that although the ASQM approaches one for an ideal uncorrupted FM signal, noise only (AWGN) yields a value of one half to the exponent power of 8.

$$\lim_{K \to \infty} \frac{\left(\sum_{k=0}^{K-1} [u^2 + v^2]\right)^2}{K \cdot \sum_{k=0}^{K-1} [u^2 + v^2]^2} = \frac{(E\{u^2\} + E\{v^2\})^2}{E\{u^4\} + 2 \cdot E\{u^2 \cdot v^2\} + E\{v^4\}};$$

but $E\{u^2\} = E\{v^2\} = \sigma^2$, and $E\{u^4\} = E\{v^4\} = 2 \cdot \sigma^4$ (normal);

$$\text{Then } \lim_{K \to \infty} \frac{\left(\sum_{k=0}^{K-1} [u^2 + v^2]\right)^2}{K \cdot \sum_{k=0}^{K-1} [u^2 + v^2]^2} = \frac{E\{u^2\}}{E\{u^4\}} = \frac{1}{2}$$

A simple adjustment to the previous ASQM expression extends the range over zero to one, with a target threshold of 0.5.

$$ASQM = \left(\frac{2 \cdot \left(\sum_{k=0}^{K-1} [\text{Re}\{x_k\}^2 + \text{Im}\{x_k\}^2]\right)^2}{K \cdot \sum_{k=0}^{K-1} [\text{Re}\{x_k\}^2 + \text{Im}\{x_k\}^2]^2}\right)^8$$

Additional details of the signal quality metric are shown in commonly assigned U.S. patent application Ser. No. 13/165,325, filed Jun. 21, 2011, for a "Method And Apparatus For Implementing Signal Quality Metrics And Antenna Diversity Switching Control", which is hereby incorporated by reference.

Other techniques have been used to determine the FM analog signal quality for the purpose of blending to mono, but they have not been effective. Existing techniques for determining analog signal quality include Received Signal Strength Indication (RSSI) and/or measuring the level of ultrasonic noise in the FM baseband multiplex signal, particularly close in frequency to the 19-kHz pilot. These existing metrics are not sufficient to deal with the higher levels of interference local to a first-adjacent IBOC signal. Lab testing of a set of modern car receivers showed that these techniques do not force the receiver to blend from stereo to a monaural signal at the expected RSSI level when the first-adjacent interference is large. The result is excess audio noise received in the geographic vicinity of the first-adjacent IBOC interferer. The RSSI simply determines signal level and assumes a noise floor (the noise floor is not necessarily measured). The ultrasonic noise is not a reliable indicator of interference noise since stereo audio processing used at the transmitter site can place noise artifacts in this ultrasonic region. Furthermore, frequency-selective fading of the received signal also places noise (distortion) in this (ultrasonic) region. However, the ASQM described herein is able to reliably detect frequency-selective fading (multipath distortion) or first-adjacent interference. The SBC is designed to blend appropriately under these conditions.

FM Receiver Performance

Figure 15:
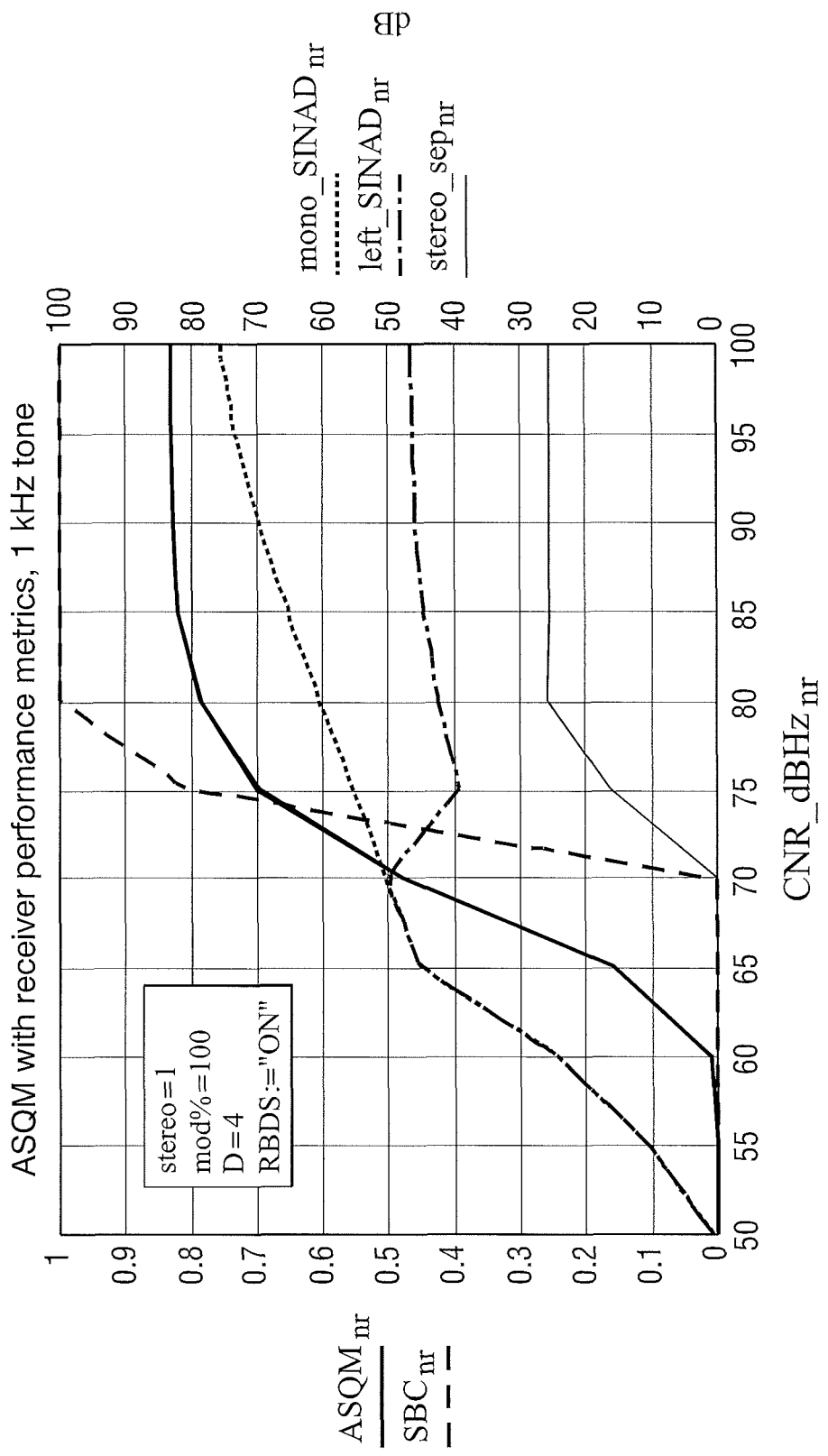
FIG. 15 is a performance plot without difference compensation.
Figure 16:
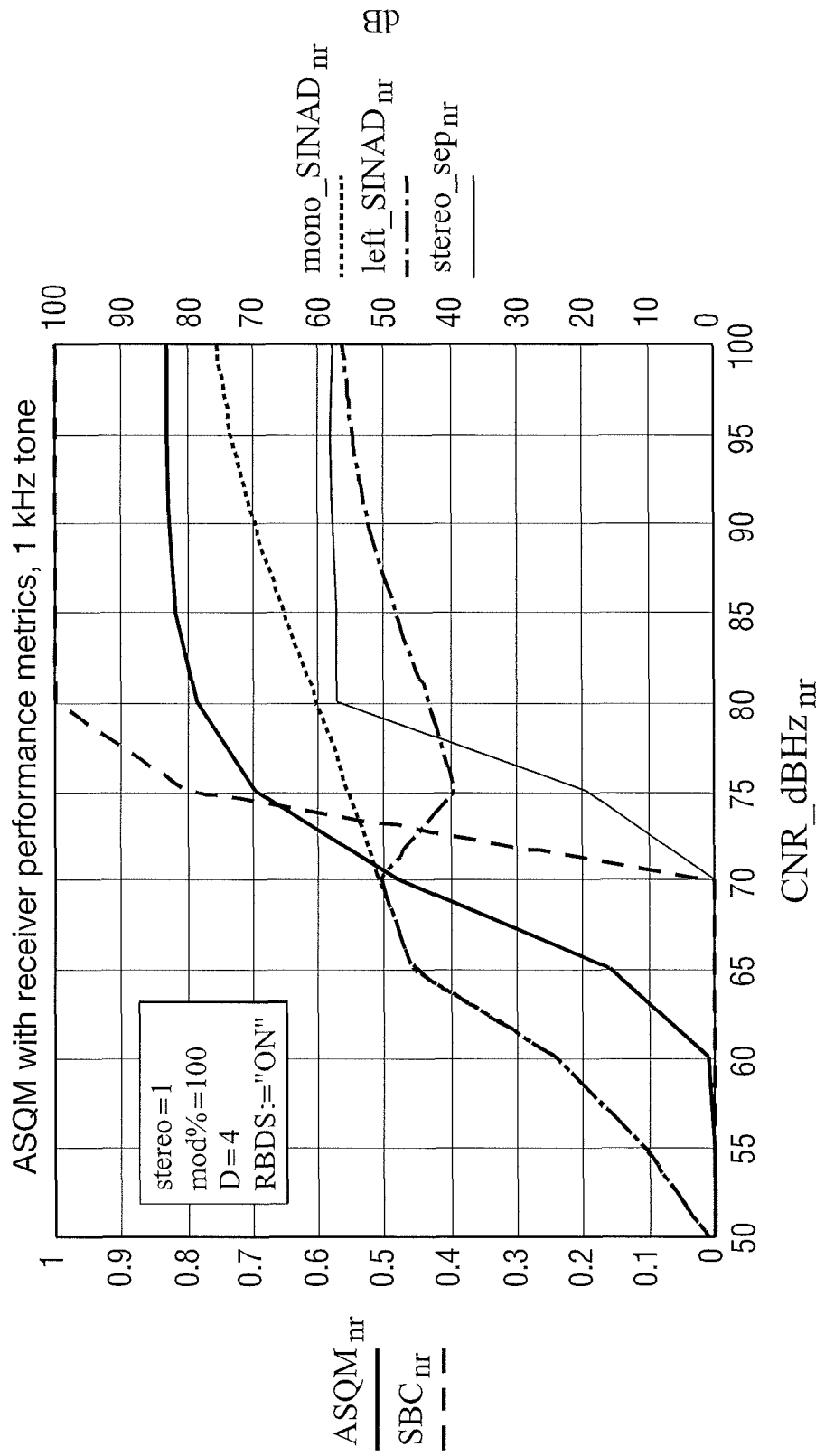
FIG. 16 is a performance plot with difference compensation.

The plots in FIGS. 15-18 show various performance metrics of the analog FM demodulator. The predetection filter has a Nyquist bandwidth of 186 kHz (±93 kHz, complex). This is established by the isolation filter, designed to effectively suppress any signals 100 kHz or greater from the center frequency. A 57 kHz unmodulated subcarrier, representative of the RBDS signal imposing a ±2 kHz deviation on the main carrier, was included on all plots with 100% or greater modulation. A transmitted stereo signal is indicated when stereo=1 on the plot. AWGN was added to the signals over a range of 50 to 100 dB_Hz carrier-to-noise-density ratio (C/No in units of dB_Hz), the horizontal axis variable. Of particular interest is the value of ASQM as a function of C/No for both of these scenarios. Notice that the ASQM for stereo plots with 100% modulation (and greater) reach a limit noticeably less than 1. This is due to the filtering of frequencies of the FM signal greater than the bandwidth of the predetection filter. FIG. 15 shows the performance without stereo difference compensation, while FIG. 16 shows performance with stereo difference compensation and click repair, both at 100% modulation. Notice the large improvement in both stereo separation and signal-to-noise and distortion ratio (SINAD) with the difference compensation of FIG. 16.

Figure 17:
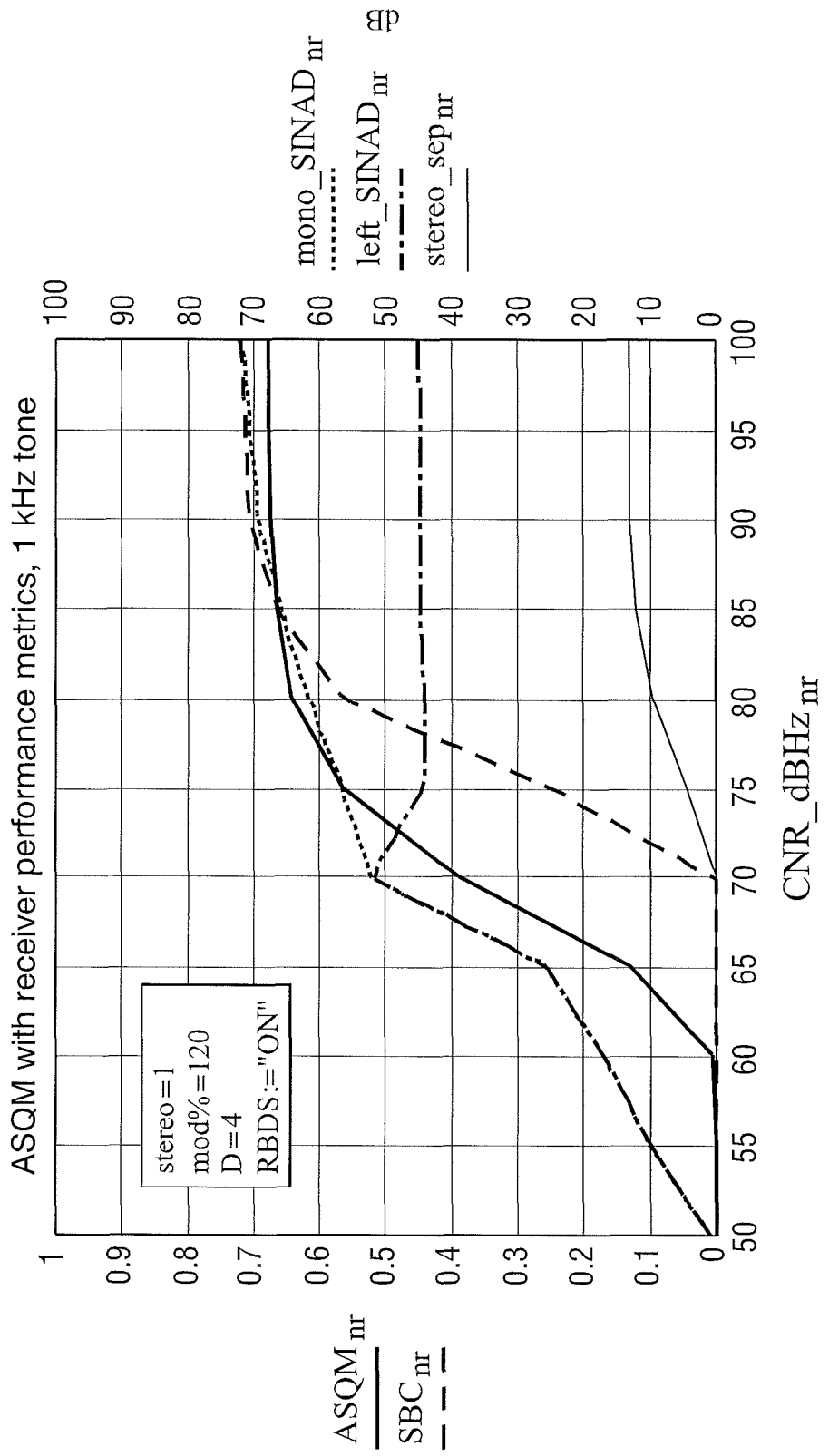
FIG. 17 is an overmodulation performance plot without difference compensation or click repair.
Figure 18:
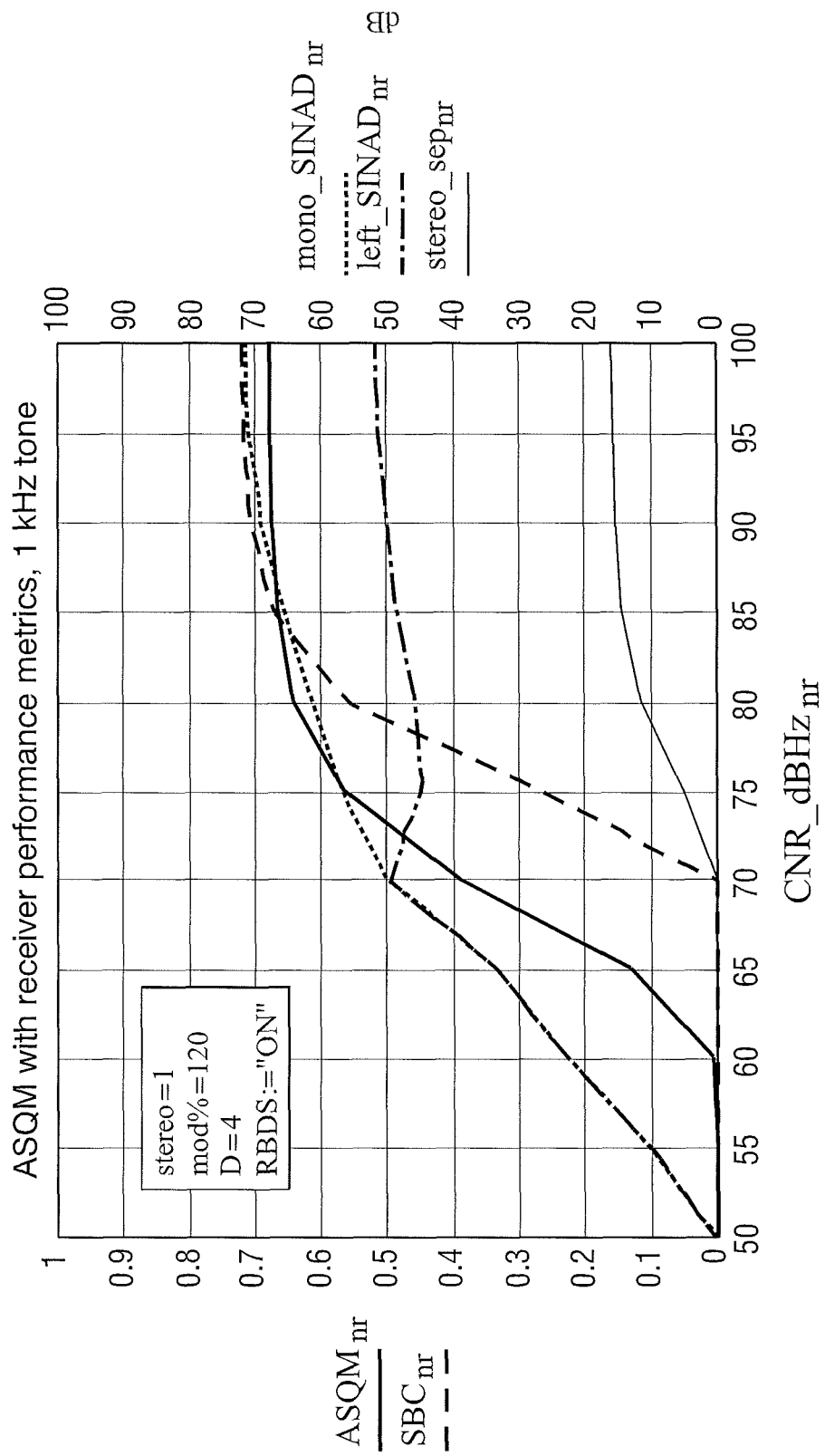
FIG. 18 is an overmodulation performance plot with difference compensation and click repair.

FIGS. 17 and 18 show results at 120% modulation without and with difference compensation and click repair, respectively. Notice that the click repair is effective in extending the low range of CNR before FM threshold, primarily for the 120% overmodulation case. The stereo difference compensation improves both SINAD in the stereo case, as well as stereo separation. Also notice in this overmodulation case that the ASQM is always less than 0.7. Filtering of the extended "overmodulated" bandwidth results in amplitude modulation, which reduces the ASQM value. Then this reduces the stereo separation, as appropriate for this overmodulation case.

The various signal-processing methods described above can be implemented in a radio receiver or other apparatus having an input for receiving the radio signal and one or more processors or other processing circuitry for performing the signal processing needed to implement the methods.

While the present invention has been described in terms of several embodiments, it will be understood by those skilled in the art that various modifications can be made to the disclosed embodiments without departing from the scope of the invention as set forth in the claims.

What is claimed is:

1. A method comprising:
   receiving an FM radio signal including an analog-modulated portion;
   digitally sampling an analog-modulated portion of the radio signal to produce a plurality of samples;
   using a ratio between an average magnitude and an RMS magnitude of a block of the samples to compute a signal quality metric;
   detecting sum and difference components of a baseband multiplex signal content;
   using the baseband content to produce an output signal; and
   blending the output signal from stereo to monaural as the signal quality metric falls below a threshold value.

2. The method of claim 1, wherein blending the output signal to monaural is performed through reduction or elimination of a stereo difference signal.

3. The method of claim 2, wherein a stereo blend control signal weights the stereo difference signal by a value ranging from 0 to 1.

4. The method of claim 3, wherein a stereo metric value is determined using a pilot power signal and the signal quality metric.

5. The method of claim 4, wherein an in-phase component of the pilot signal is filtered, the power of the filtered pilot signal is measured, and then the pilot signal is filtered again to provide a measure of the pilot power, having a normalized range from zero to approximately 1.

6. The method of claim 3, wherein the stereo blend control signal is formed as a function of both a filtered and unfiltered stereo metric signal.

7. An apparatus comprising:
an input for receiving an FM radio signal including an analog-modulated portion; and
processing circuitry for digitally sampling an analog-modulated portion of the radio signal to produce a plurality of samples,
using a ratio between an average magnitude and an RMS magnitude of a block of the samples to compute a signal quality metric,
detecting sum and difference components of a baseband content, using the baseband content to produce an output signal, and
blending the output signal from stereo to monaural as the signal quality metric falls below a threshold value.

8. The apparatus of claim 7, wherein blending the output signal to monaural is performed through reduction or elimination of a stereo difference signal.

9. The apparatus of claim 8, wherein a stereo blend control signal weights the stereo difference signal by a value ranging from 0 to 1.

10. The apparatus of claim 9, wherein a stereo metric value is determined using a pilot power signal and the signal quality metric.

11. The apparatus of claim 10, wherein an in-phase component of the pilot signal is filtered, the power of the filtered pilot signal is measured, and then the pilot signal is filtered again to provide a measure of the pilot power, having a normalized range from zero to approximately 1.

12. The apparatus of claim 9, wherein the stereo blend control signal is formed as a function of both a filtered and unfiltered stereo metric signal.

* * * * *